(12) United States Patent
Henry et al.

(10) Patent No.: US 11,828,832 B2
(45) Date of Patent: Nov. 28, 2023

(54) INFRASTRUCTURE TRIGGERING TECHNIQUES TO FACILITATE SECURE ULTRA-WIDEBAND (UWB) RANGING

(71) Applicant: Cisco Technology, Inc., San Jose, CA (US)

(72) Inventors: Jerome Henry, Pittsboro, NC (US); Robert Edgar Barton, BC (CA); Matthew Aaron Silverman, Shaker Heights, OH (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 68 days.

(21) Appl. No.: 17/123,904

(22) Filed: Dec. 16, 2020

(65) Prior Publication Data
US 2022/0066010 A1     Mar. 3, 2022

Related U.S. Application Data

(60) Provisional application No. 63/069,929, filed on Aug. 25, 2020.

(51) Int. Cl.
*H04W 24/00*     (2009.01)
*G01S 13/02*     (2006.01)
(Continued)

(52) U.S. Cl.
CPC .......... *G01S 13/0209* (2013.01); *G01S 5/145* (2013.01); *G01S 13/765* (2013.01);
(Continued)

(58) Field of Classification Search
CPC .... G01S 13/0209; G01S 5/145; G01S 13/765; H04W 76/15; H04W 76/11; H04W 64/003
See application file for complete search history.

(56) References Cited

U.S. PATENT DOCUMENTS

| 6,941,110 B2 | 9/2005 | Kloper et al. |
| 8,144,685 B2 | 3/2012 | Sakoda |

(Continued)

FOREIGN PATENT DOCUMENTS

| CN | 105430767 B | 3/2016 |
| CN | 109348409 A | 2/2019 |

(Continued)

OTHER PUBLICATIONS

Michael Stocker, BSc, "Design of a Decentralized and Synchronous UWB-based Localization System", Graz University of Technology (TU Graz), May 2018, 111 pages.

(Continued)

*Primary Examiner* — Justin Y Lee
(74) *Attorney, Agent, or Firm* — Edell, Shapiro & Finnan, LLC

(57) ABSTRACT

Presented herein are infrastructure triggering techniques for secure Ultra-Wideband (UWB) ranging. In one example, a method may include providing UWB ranging parameters to a mobile device via a first radio communication, wherein the first radio communication is a non-UWB radio communication; and triggering the mobile device to perform UWB ranging with a UWB anchor, wherein the triggering is performed using a second radio communication. In another example, a method may include, obtaining, by a mobile device, UWB ranging parameters for a geographic area; obtaining a UWB ranging instruction for the geographic area; and performing UWB ranging with a target UWB anchor based on the UWB ranging parameters and the UWB ranging instruction.

20 Claims, 13 Drawing Sheets

(51) Int. Cl.
*H04W 76/15* (2018.01)
*H04W 76/11* (2018.01)
*G01S 5/14* (2006.01)
*G01S 13/76* (2006.01)
*H04W 64/00* (2009.01)

(52) U.S. Cl.
CPC .......... *H04W 64/003* (2013.01); *H04W 76/11* (2018.02); *H04W 76/15* (2018.02)

(56) References Cited

U.S. PATENT DOCUMENTS

| | | |
|---|---|---|
| 8,515,411 B2 | 8/2013 | Sarkar et al. |
| 8,559,887 B2 | 10/2013 | Stager et al. |
| 8,776,221 B2 | 7/2014 | Rangarajan et al. |
| 9,763,216 B2 | 9/2017 | Sayeed |
| 9,823,330 B2 | 11/2017 | Hart et al. |
| 9,949,083 B1 | 4/2018 | Kirby et al. |
| 9,998,856 B2 | 6/2018 | Edge |
| 10,064,012 B1 | 8/2018 | Boston et al. |
| 11,082,809 B1 | 8/2021 | Burowski et al. |
| 11,199,406 B2 | 12/2021 | Dormody et al. |
| 11,246,010 B2 | 2/2022 | Mao et al. |
| 11,271,943 B2 | 3/2022 | Urabe et al. |
| 2005/0085190 A1 | 4/2005 | Nishikawa |
| 2005/0135811 A1 | 6/2005 | Lee et al. |
| 2005/0228613 A1 | 10/2005 | Fullerton et al. |
| 2008/0101296 A1 | 5/2008 | Palin et al. |
| 2008/0186231 A1 | 8/2008 | Mjadeff et al. |
| 2009/0311960 A1 | 12/2009 | Farahani et al. |
| 2010/0271263 A1 | 10/2010 | Moshfeghi |
| 2013/0138314 A1 | 5/2013 | Vittala et al. |
| 2014/0152437 A1 | 6/2014 | Tian et al. |
| 2015/0156637 A1 | 6/2015 | Li et al. |
| 2015/0289099 A1 | 10/2015 | Marano et al. |
| 2015/0378002 A1 | 12/2015 | Hughes et al. |
| 2016/0178727 A1 | 6/2016 | Bottazzi |
| 2016/0212579 A1 | 7/2016 | Duan et al. |
| 2017/0003374 A1 | 1/2017 | Hehn et al. |
| 2017/0082727 A1 | 3/2017 | Sendonaris et al. |
| 2017/0123039 A1 | 5/2017 | Shin et al. |
| 2017/0123045 A1 | 5/2017 | Shin et al. |
| 2017/0280281 A1 | 9/2017 | Pandey et al. |
| 2017/0356979 A1 | 12/2017 | Georgiou et al. |
| 2018/0059231 A1 | 3/2018 | Dewberry et al. |
| 2018/0310272 A1 | 10/2018 | Younis |
| 2019/0033423 A1 | 1/2019 | Moshreghi |
| 2019/0110227 A1 | 4/2019 | Lepp et al. |
| 2019/0135229 A1* | 5/2019 | Ledvina .................. H04W 4/40 |
| 2019/0166574 A1 | 5/2019 | Abou-Rizk et al. |
| 2019/0187241 A1 | 6/2019 | Jaeger |
| 2019/0195981 A1 | 6/2019 | Ding et al. |
| 2019/0252064 A1 | 8/2019 | Pipher et al. |
| 2019/0337155 A1 | 11/2019 | Kwak et al. |
| 2019/0349709 A1 | 11/2019 | Kim et al. |
| 2019/0387374 A1 | 12/2019 | Gherardi et al. |
| 2020/0014526 A1 | 1/2020 | Hammerschmidt et al. |
| 2020/0037113 A1 | 1/2020 | Tyagi et al. |
| 2020/0041601 A1 | 2/2020 | Ko et al. |
| 2020/0137676 A1 | 4/2020 | Yoon et al. |
| 2020/0178036 A1 | 6/2020 | Edge |
| 2020/0209341 A1 | 7/2020 | Ylamurto et al. |
| 2020/0228943 A1 | 7/2020 | Martin et al. |
| 2020/0314681 A1 | 10/2020 | Kuo et al. |
| 2021/0136556 A1* | 5/2021 | Lee .......................... H04L 1/08 |
| 2021/0352434 A1 | 11/2021 | Harvey et al. |
| 2021/0373142 A1 | 12/2021 | Lim |
| 2021/0400441 A1 | 12/2021 | Burowski et al. |
| 2022/0011398 A1 | 1/2022 | Duan et al. |

FOREIGN PATENT DOCUMENTS

| | | |
|---|---|---|
| CN | 105430767 B | 4/2019 |
| CN | 110730422 A | 1/2020 |
| CN | 210042235 U | 2/2020 |
| WO | 2015078327 A1 | 6/2015 |
| WO | 2017091792 A1 | 6/2017 |
| WO | 2019067105 A1 | 4/2019 |
| WO | 2022025693 A1 | 2/2022 |

OTHER PUBLICATIONS

Sang, Cung Lian et al., "Numerical and Experimental Evaluation of Error Estimation for Two-Way Ranging Methods", www.mdpi.com/journal/sensors, Feb. 1, 2019, 28 pages.

Harnesswalla, Taha, "IEEE 802.15.4a—Understanding the protocol and Reducing Multi-User Interference ", Apr. 9, 2013, 80 pages.

El-Kamchouchi, Hassan Mohamed et al., "Towards a Precise Direction of Arrival Estimation for Coherent Sources Using ECMUSIC", Journal of Electrical and Electronic Engineering vol. 4, Issue 2, http://article.sciencepublishinggroup.com/html/10.11648.j.jeee.20160402.17.html, Apr. 2016, 9 pages.

Xiaojie Zhao et al., "Does BTLE measure up against WiFi? A comparison of indoor location performance", VDE Verlag Gmbh, Berlin, Offenbach, Germany, ISBN 978-3-8007-3621-8, European Wireless 2014, 6 pages.

Qiang Xu et al., "Device Fingerprinting in Wireless Networks: Challenges and Opportunities", IEEE Communications Surveys & Tutorials, vol. 18, No. 1, Draft dated Jan. 8, 2015, 22 pages.

Paul Cheong, et al., "An Energy-Efficient Positioning-Enabled MAC Protocol (PMAC) for UWB Sensor Networks," Proceedings of IST mobile and wireless communications summit, 2005, 6 pages.

"IEEE Standard for Low-Rate Wireless Networks—Amendment 1: Enhanced Ultra Wideband (UWB) Physical Layers (PHYs) and Associated Ranging Techniques," IEEE Standards Association, IEEE Std 802.15.4z™-2020, Aug. 25, 2020, 174 pages.

"IEEE Standard for Information technology—Telecommunications and information exchange between systems—Local and metropolitan area networks—Specific requirements—Part 15.4: Wireless Medium Access Control (MAC) and Physical Layer (PHY) Specifications for Low-Rate Wireless Personal Area Networks (WPANs)—Amendment 1: Add Alternate PHYs," IEEE, IEEE Std 802.15.4a™-2007, Aug. 31, 2007, 203 pages.

International Search Report and Written Opinion in counterpart International Application No. PCT/US2021/046415, dated Nov. 26, 2021, 14 pages.

"802.15.4-2020—IEEE Standard for Low-Rate Wireless Networks," IEEE Xplore, Jul. 23, 2020, 3 pages; https://ieeexplore.ieee.org/document/9144691.

"802.15.6-2012—Part 15.6: Wireless Body Area Networks," IEEE Standard for Local and metropolitan area networks, IEEE Computer Society, Feb. 29, 2012, 271 pages.

* cited by examiner

INFRASTRUCTURE TRIGGERING TECHNIQUES TO FACILITATE SECURE ULTRA-WIDEBAND (UWB) RANGING

PRIORITY CLAIM

This application claims the benefit of priority under 35 U.S.C. § 119 to U.S. Provisional Application No. 63/069,929, filed Aug. 25, 2020, the entirety of which is incorporated herein by reference.

TECHNICAL FIELD

The present disclosure relates to network equipment and services.

BACKGROUND

Networking architectures have grown increasingly complex in communications environments, particularly mobile networking environments. In some instances, it is useful to determine mobile device location within a mobile networking environment. While Institute of Electrical and Electronics Engineers (IEEE) 802.11 (e.g., Wi-Fi®) or Bluetooth® ranging techniques may be utilized in some cases to determine mobile device location, such technologies typically provide limited location accuracy. Ultra-Wideband (UWB), as defined in IEEE 802.15.4a and 802.15.4z, may offer improved ranging accuracy over Wi-Fi® and Bluetooth®, however, utilizing a UWB radio or chip for a mobile device creates a battery cost for the device. Accordingly, there are significant challenges with using UWB ranging for mobile devices.

BRIEF DESCRIPTION OF THE DRAWINGS

FIGS. 6D-1 and 6D-2 are diagrams illustrating example details associated with UWB ranging, according to an example embodiment.

DESCRIPTION OF EXAMPLE EMBODIMENTS

Overview

Figure 1:
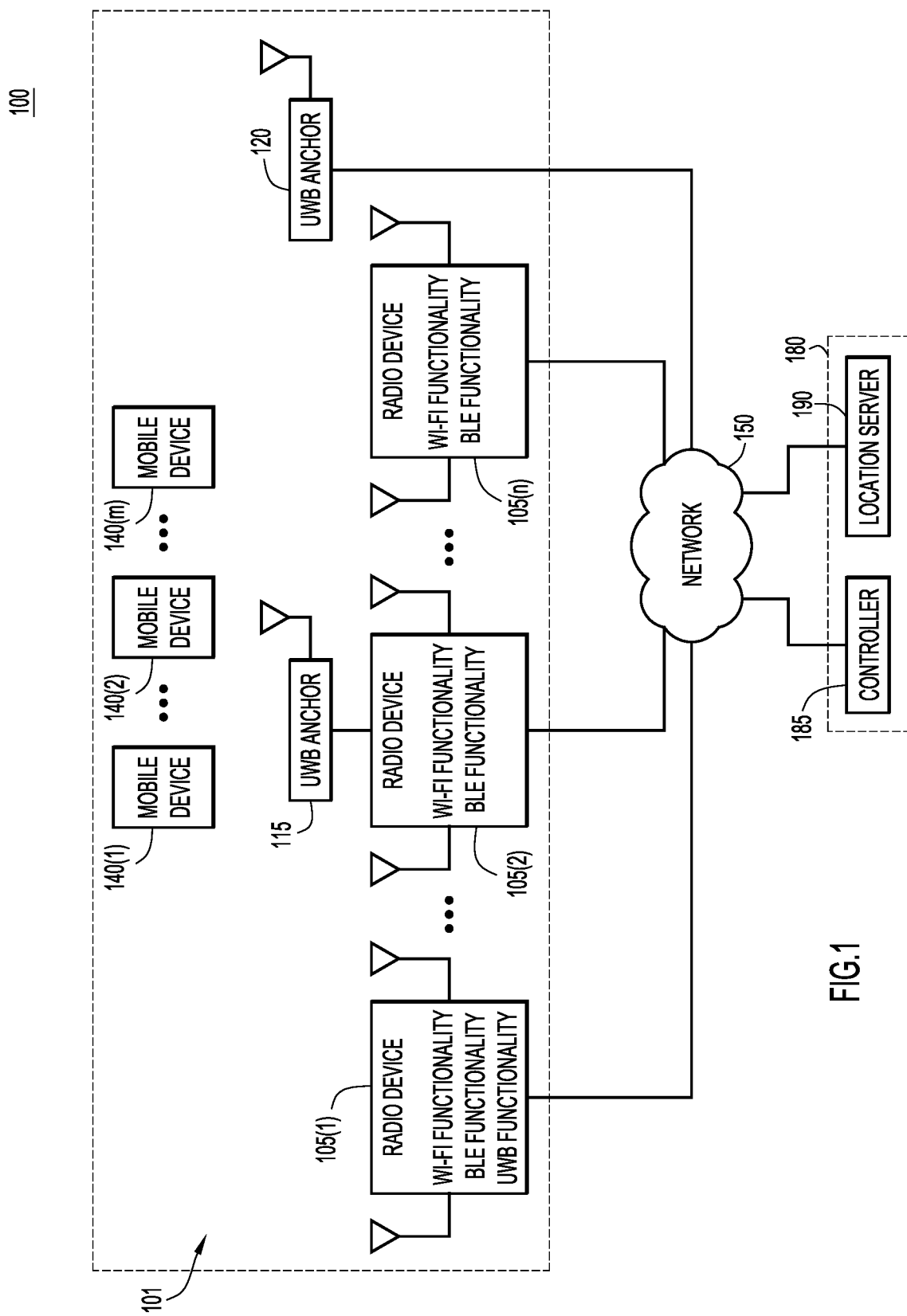
FIG. 1 is a diagram of a system in which infrastructure triggering techniques to facilitate Ultra-Wideband (UWB) ranging may be implemented, according to an example embodiment.

Techniques presented herein may facilitate triggering Ultra-Wideband (UWB) ranging on a mobile device, also referred to herein as a client or station (STA). As UWB may not be available in all locations, mobile devices may selectively enable UWB ranging, as triggered by an infrastructure. Thus, techniques herein may allow an infrastructure to enable UWB ranging on a large number of mobile devices (e.g., hundreds or more) that may be concurrently entering a venue or other geographic location. In various embodiments, mobile devices may also be provided with instructions, parameters, and/or other information related to ranging modes, ranging times, and access point/UWB anchor information that may allow each of one or more mobile devices to range securely against one or more different groups of UWB anchors.

In some instances, the infrastructure can also direct UWB ranging actions of mobile devices, thereby organizing mobile device ranging airtime consumption based on various infrastructure criteria. Techniques herein may also allow the infrastructure to stop ranging for one or a group of mobile devices, for example, in locations where movements may not be relevant and/or for instances in which hyper-location accuracy may not be needed.

In one embodiment, a method is provided that may include providing ultra-wideband (UWB) ranging parameters to a mobile device via a first radio communication, wherein the first radio communication is a non-UWB radio communication; and triggering the mobile device to perform UWB ranging with a target UWB anchor, wherein the triggering is performed using a second radio communication.

In one embodiment, a method is provided that may include obtaining, by a mobile device, UWB ranging parameters for a geographic area (e.g., a venue, etc.). The UWB ranging parameters may be obtained by the mobile device via a non-UWB radio communication. The method may further include obtaining, by the mobile device, a UWB ranging instruction in which the UWB ranging instruction identifies, at least in part, a target UWB anchor with which the mobile device is to perform UWB ranging. The UWB ranging instruction may be obtained by the mobile device via a non-UWB radio communication. The method may further include performing, by the mobile device, UWB ranging with the target UWB anchor based on the UWB ranging parameters and the UWB ranging instruction. The method may further include the mobile device obtaining location information indicating a location of the mobile device as a result of the UWB ranging.

EXAMPLE EMBODIMENTS

UWB, as defined in Institute of Electrical and Electronics Engineers (IEEE) 802.15.4a and 802.15.4z, offers accurate ranging for a UWB client/mobile device. Presented herein are techniques in which an infrastructure can trigger Ultra-Wideband (UWB) UWB ranging for a client/mobile device. The result from the UWB client ranging can be shared between the infrastructure and the client. Client ranging can be used, for example, for detecting and/or tracking a location of a mobile device. Client ranging using a UWB localization technique, i.e., a localization technique involving UWB transmissions, is referred to herein as 'UWB ranging'. The terms 'client', 'mobile device', and 'station' (STA) can be used herein interchangeably.

For example, UWB ranging can include time-of-flight (ToF), time-of-arrival (ToA), time-difference-of-arrival (TDoA), received signal strength indicator (RSSI), and/or other analyses of UWB transmissions. UWB ranging is relatively precise, providing ranging accuracy within about 10 centimeters in line-of-sight (LoS) situations. This level of accuracy is useful for both client-driven and infrastructure-based applications where, for example, Bluetooth Low Energy (BLE) or IEEE 802.11 (e.g., Wi-Fi, Wi-Fi6, etc.) based ranging may provide disappointing results (e.g., for an area with poor Radio Frequency (RF) conditions, in an insufficient or improper Angle of Arrival (AoA) deployment, lack of consistency of range results between the different techniques, etc.).

Beyond UWB tags, UWB radios or chips may be configured to facilitate UWB ranging for mobile devices, such as smartphones, but utilizing such UWB chipsets/radios may involve certain challenges. For mobile devices already having an always-on BLE radio, a mostly always-on wireless wide area access network radio (e.g., Third Generation Partnership Project (3GPP) Fourth Generation (4G)/Long Term Evolution (LTE), Fifth Generation (5G), next Generation (nG), etc.), and often-on Wi-Fi radio, the further addition of a new radio chip adds an additional, potentially unbearable battery cost.

For example, a primary challenge is that a mobile device, such as a smartphone, typically expects some kind of BLE device to need to connect with the phone (e.g., a headset, wearable device, etc.), always expects to be in range (and need to connect to) some 3GPP access system (e.g., LTE), sometimes expects to connect to Wi-Fi (this is why the Wi-Fi radio sleeps at intervals when no Wi-Fi connection is active), but seldom expects UWB to be needed (as we do not share files using UWB often, we do not know which venue has UWB, etc.); thus, keeping the UWB radio on to use it for what is typically a small amount of time would be a gigantic power waste.

Currently, each of the 60 million iPhone® 11 mobile devices has a UWB chipset that is off most of the time and is only activated when file sharing is triggered (so as to determine the relative position of an iPhone to which to send a file). iPhone® is a registered trademark of Apple Inc. UWB can also be enabled by an indoor positioning application in some instances if UWB anchors are available in a building.

However, in current deployments, the UWB chipset on the client side (for a mobile device) typically does not have information about the presence of UWB anchors (as it is shut off for the times outside of file sharing). Further for current deployments, when infrastructure-based location techniques detect poor accuracy, there are currently no mechanisms through which to use the client UWB chipset, as the chip is off and UWB as utilized in current deployments has no remote triggering mechanism to facilitate ranging.

Additionally, activation of the UWB chipset on a client by a local positioning application typically does not help the infrastructure obtain high client range accuracy, as such ranging that is triggered by the client is obtained by the client from signals received from the infrastructure. However, the infrastructure does not necessarily receive signals from the client that to allow the infrastructure to determine the client location. Moreover, for scenarios involving high client density in a venue (e.g., for a conference event, sporting event, etc.), hundreds of clients entering such a venue with the same application enabled could overload a local UWB anchor without proper scheduling.

Presented herein are techniques in which an infrastructure (e.g., any combination of Wi-Fi Access Points (APs), UWB anchors, a network controller, and/or a network location server) can trigger UWB ranging on a client/mobile device. The result from the UWB ranging can be shared between the infrastructure and the mobile device. Exchanges between the mobile device and the infrastructure can be protected to avoid battery attacks through false triggers. Further, exchanges may be reduced to involve minimal airtime consumption so as to allow the system to scale to high-density environments.

The infrastructure triggering techniques provided herein may involve three phases of operations including a readiness phase, a broadcasting phase, and a unicast phase. Generally, the readiness phase operations may involve a client/mobile device learning that UWB ranging is available for a venue or location and the broadcasting phase operations may involve enabling a client/mobile device to perform UWB ranging with a master or target UWB anchor. Generally, the unicast phase operations may involve individual client instructions for various use cases. Various operations that may be performed for each phase are discussed in further detail herein.

Turning now to FIG. 1, a block diagram is shown of a system 100 in which infrastructure triggering techniques that facilitate UWB ranging may be implemented, according to an example embodiment. System 100 may include a plurality of radio devices 105(1)-105(n) (referred to herein, generally, as radio devices 105) configured within a space or geographic area 101 (e.g., a venue or location). The plurality of radio devices 105 may be configured to wirelessly communicate with a plurality of mobile devices 140(1)-140(m) (referred to herein, generally, as mobile devices 140) via one or more of a variety of radio (e.g., RF) communication technologies. Each of the radio devices 105 can include any access point (AP) or other radio device configured to facilitate communications involving one or more mobile devices (such as mobile devices 140). For example, radio devices 105 may include one or more APs configured to facilitate communications between one or more of the mobile devices 140 and a network 150. Access points are sometimes referred to herein as wireless local area network (WLAN) or wireless local area (WLA) access network (AN) APs.

Each of the radio devices 105 can communicate with (e.g., send transmissions to, and/or receive transmission from) one or more of the mobile devices 140 using any combination of relatively short-range or near field wireless local area (WLA) communication technologies, such as (but not limited to) 802.11 (e.g., Wi-Fi, Wi-Fi6, etc.), BLE, UWB, Citizens Broadband Radio Service (CBRS), and/or short-range 5G (e.g., millimeter wave) radio communication technologies. As referred to herein, the terms '802.11', 'Wi-Fi', '802.11/Wi-Fi', and variations thereof are meant to refer to any variant of IEEE 802.11 radio communication technologies. In one example, radio device 105(1) includes built-in/integrated 802.11/Wi-Fi radio connectivity/functionality for communicating with one or more of the mobile devices 140 over 802.11/Wi-Fi radio communications, BLE radio connectivity/functionality for communicating with one or more of the mobile devices 140 over BLE radio communications, and UWB radio connectivity/functionality for communicating with one or more of the mobile devices 140 over UWB radio communications. Radio device 105(2) includes built-in/integrated 802.11/Wi-Fi radio connectivity/functionality and BLE radio connectivity/functionality but not UWB radio connectivity/functionality. However, radio device 105(2) is configured to achieve UWB radio connectivity/functionality via a separate, peripheral UWB anchor device 115 connected to radio device 105(2). For example, the peripheral UWB anchor device 115 can be embodied in a peripheral device connected to radio device 105(2) via a universal serial bus (USB) dongle, a time-synchronized network (TSN) connection, or another connection technology now known or hereinafter developed. Radio device 105($n$) also does not include built-in/integrated UWB radio connectivity/functionality, and is not connected to a peripheral UWB anchor device. Therefore, radio device 105($n$) is not configured to achieve UWB radio connectivity/functionality.

Each of the mobile devices 140 can include any mobile device or other object capable of over-the-air RF communications utilizing any combination of WLA communication technologies such as (but not limited to) Wi-Fi, BLE, and UWB radio communication technologies. In some instances, one or more of the mobile devices 140 also may be capable of over-the-air RF communications utilizing one or more wireless wide area (WWA) communication technologies, such as 3GPP communication technologies (e.g., 4G/LTE, 5G, nG etc.). For example, each of the mobile devices 140 can include any combination of a mobile wireless phone, computer, tablet, smart glasses, Augmented Reality tool, an electronic tag (which may, e.g., be coupled to, or associated with, an electronic or non-electronic object), or another device or object now known or hereinafter developed.

Each of the mobile devices 140 is configured to communicate with one or more of the radio devices 105. For example, each of the mobile devices 140 may include Wi-Fi radio connectivity/functionality for communicating with one or more of the radio devices 105 via Wi-Fi radio communications, BLE radio connectivity/functionality for communicating with one or more of the radio devices 105 via BLE radio communications, and/or UWB radio connectivity/functionality for communicating with one or more of the radio devices 105 via UWB radio communications (either directly or via a peripheral UWB anchor device 115).

The mobile devices 140 also may be configured to communicate via UWB radio communications with one or more standalone UWB anchor devices 120. A standalone UWB anchor device 120 includes functionality for receiving (and potentially also sending and/or processing) UWB transmissions without being connected to, or integrated with, a radio device 105. Each standalone UWB anchor device 120 also may include one or more other communication capabilities, such as BLE wireless radio communication capabilities and/or 802.11 wireless radio communication capabilities, and/or wired communication capabilities, e.g., via a connection to a network (such as network 150) over Ethernet or another connection mechanism now known or hereinafter developed.

The terms 'UWB anchor' and 'anchor' are used interchangeably herein to refer to any device or object configured to detect UWB transmissions from one or more mobile devices (e.g., one or more of the mobile devices 140). For example, a UWB anchor can include a standalone UWB anchor device 120, a peripheral UWB anchor device 115 connected to a radio device (e.g., as shown for radio device 105(2)), and/or a radio device having UWB radio connectivity/functionality (e.g., as shown for radio device 105(1)). As would be appreciated by a person of ordinary skill in the art, while a UWB anchor can be implemented as a radio device 105, not all UWB anchors may be implemented as radio devices 105, and not all radio devices 105 may constitute UWB anchors.

It should be appreciated that the number, type, and arrangement of the radio devices 105, mobile devices 140, peripheral UWB anchor devices 115, and standalone UWB anchor devices 120, and their respective connectivity configurations and capabilities, are illustrative and can vary in alternative example embodiments.

The radio devices 105, peripheral UWB anchor device 115, standalone UWB anchor device 120, and mobile devices 140 are configured to communicate with a control device 180 via a network 150. The network 150 includes any communications medium for transmitting information between two or more computing devices. For example, the network 150 can include a local area network (LAN), wide area network (WAN), virtual private network (VPN), Intranet, Internet, hardwire connections, modem connections, wireless connections, or combinations of one or more these items.

The control device 180 includes one or more computing devices, which include a controller 185 and a location server 190. The controller 185 includes hardware, software, and/or logic that can be configured to manage operation of the radio devices 105. For example, the controller 185 may be configured to facilitate certain communications involving one or more of the mobile devices 140 through one or more of the radio devices 105. In at least one embodiment, controller 185 may be implemented as a wireless LAN controller (WLC). In one form, the controller 185 and the location server 190 may be separate and physically distinct entities. Alternatively, at least certain of the features and/or functionality of the controller 185 and location server 190 may be integrated into a single entity, certain of the features and/or functionality described herein in connection with the controller 185 may be included in, and/or performed by, the location server 190, and/or certain of the features and/or functionality described herein in connection with the location server 190 may be included in, and/or performed by, the controller 185.

The location server 190 includes hardware, software, and/or logic that are configured to manage location-related transmissions involving the radio devices 105, peripheral UWB anchor device 115, standalone UWB anchor device 120, and/or mobile devices 140. For example, the location server 190 can be configured to cooperate with the radio devices 105, peripheral UWB anchor device 115, standalone UWB anchor device 120, and/or mobile devices 140 to initiate and complete client ranging procedures within the geographic area 101, e.g., by assigning and/or instructing one or more of the radio devices 105, peripheral UWB anchor device 115, and/or standalone UWB anchor device 120 to complete client ranging procedures with respect to one or more of the mobile devices 140.

In one example, the location server 190 can be configured so that, when a mobile device 140 enters the geographic area 101, the location server 190 assigns one of the radio devices 105, peripheral UWB anchor device 115, or standalone UWB anchor device 120 as a primary or target UWB anchor for engaging in a location/ranging exchange with the mobile device 140 and other(s) of the radio devices 105, peripheral UWB anchor device 115, and/or standalone UWB anchor device 120 as secondary anchors for passively receiving transmissions from the mobile device 140 and transmissions from the primary UWB anchor for location processing.

The geographic area 101 can include any combination of an indoor and/or outdoor area, such as a home, school, campus, office building, conference center, stadium, one or more floors of a multi-floor structure, and/or any other venue, space, or location or portion thereof. The geographic area 101 may support any density of mobile devices 140. The location server 190 can be configured to assign anchors so that accurate client ranging is enabled for each of the mobile devices 140 regardless of density. For example, for a particular mobile device 140, the location server 190 can select an optimal set of anchors for client ranging from all available radio devices 105, peripheral UWB anchor devices 115, and/or standalone UWB anchor devices 120 in the geographic area 101.

The location server 190 can be configured to coordinate client ranging procedures involving any of a variety of different localization techniques. In an example embodiment, the location server 190 can be configured to coordinate client ranging procedures involving one or more UWB localization techniques, such as ToF, ToA, TDoA, RSSI, and/or another technique involving analysis of UWB transmissions, and/or one or more non-UWB localization techniques, such as lateration, AoA, or another technique that does not involve UWB transmissions. For example, the location server 190 can estimate a coarse location for a mobile device 140 using a non-UWB localization technique, select a master or target UWB anchor point based on the coarse location for performing UWB ranging with the mobile device in order to determine more precise location information for the mobile device 140 using one or more UWB localization techniques.

The location server 190 can include logic for performing one or more location computations based on the localization techniques. For example, the location server 190 can process time, distance, angle, signal strength or other information from one or more of the radio devices 105, peripheral UWB anchor devices 115, standalone UWB anchor devices 120, and/or mobile devices 140 to determine and/or track a location of a particular one of the mobile devices 140. The location server 190 can be configured to return results of that processing to the particular one of the mobile devices 140, e.g., through one or more of the radio devices 105, or to some other entity seeking that location information, if so desired. In addition, or in the alternative, the radio devices 105, peripheral UWB anchor devices 115, standalone UWB anchor devices 120, and/or mobile devices 140 can be configured to perform certain location computations and, potentially, to report results from those computations to the location server 190.

Though illustrated in FIG. 1 as discrete components, and as explained above, it should be appreciated that the controller 185 and location server 190 may be integrated or otherwise reconfigured in any number of different components without departing from the broad scope of embodiments presented herein.

Figure 2:
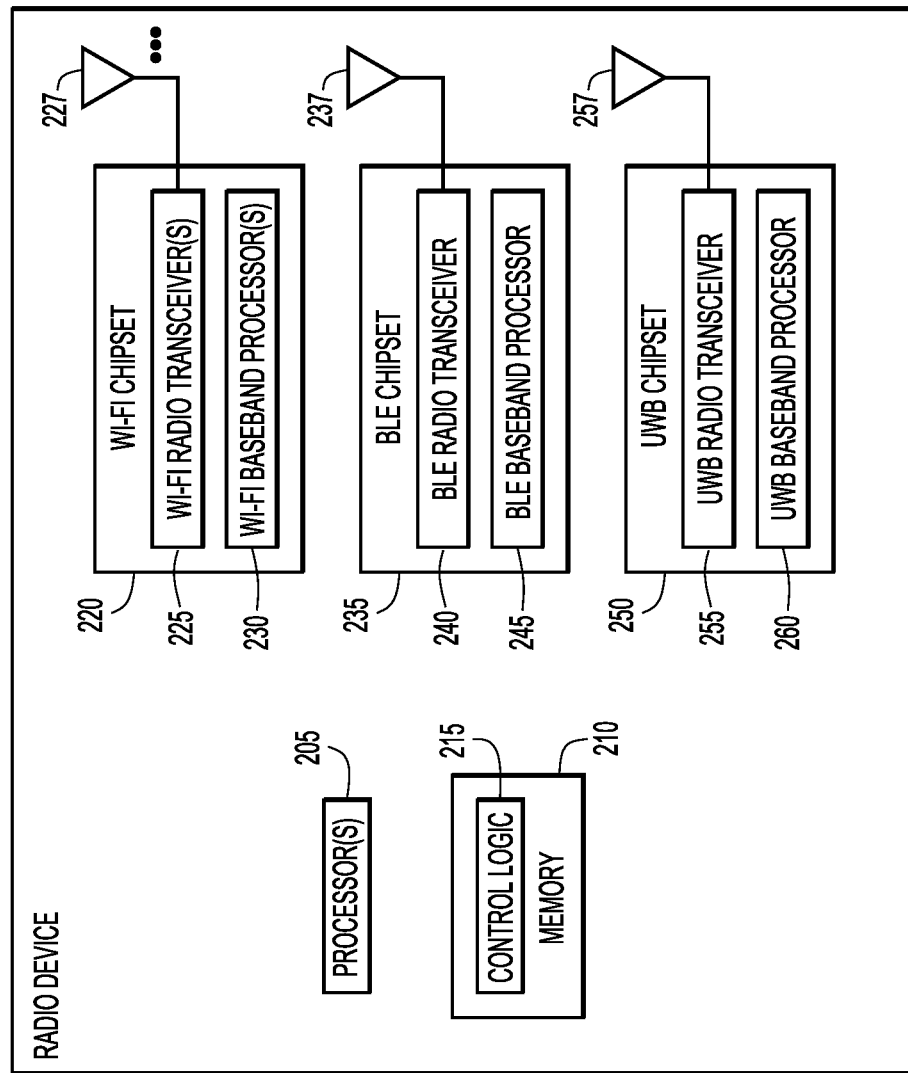
FIG. 2 is a block diagram of a radio device configured to participate in the techniques presented herein, according to an example embodiment.

Referring to FIG. 2, FIG. 2 is a block diagram of a radio device 200, according to an example embodiment. In at least one embodiment, the radio device 200 may include any combination of a Wi-Fi chipset 220 for providing Wi-Fi radio connectivity/functionality, a BLE chipset 235 for providing BLE radio connectivity/functionality, and a UWB chipset 250 for providing UWB radio connectivity/functionality. The Wi-Fi chipset 220 may include one or more Wi-Fi radio transceivers 225 configured to perform Wi-Fi RF transmission and reception via one or more antenna(s) 227, and one or more Wi-Fi baseband processors 230 configured to perform Media Access Control (MAC) and physical layer (PHY) modulation/demodulation processing. The BLE chipset 235 may include a BLE radio transceiver 240 configured to perform BLE RF transmission and reception via one or more antenna(s) 237, and a BLE baseband processor 245 configured to perform BLE baseband modulation and demodulation. The UWB chipset 250 may include a UWB radio transceiver 255 configured to perform UWB RF transmission and reception via one or more antenna(s) 257, and a UWB baseband processor 260 configured to perform UWB baseband modulation and demodulation. For example, the Wi-Fi chipset 220, BLE chipset 235, and UWB chipset 250 may be implemented in one or more application-specific integrated circuits (ASICs), field-programmable gate arrays (FPGAs), and/or other digital logic embodied in one or more integrated circuits. Antennas 227, 237, and 257 may be the same or different antennas and may include any combination of antennas, antenna arrays, etc.

The radio device 200 includes one or more processors 205, which may embody or include one or more hardware microprocessors and/or microcontrollers. In addition, the radio device 200 includes a memory 210 that stores control logic 215. The processor(s) 205 are configured to execute instructions of the control logic 215 to execute various control functions for the radio device 200.

As would be understood by a person of ordinary skill in the art, the features and functionality of the radio device 200 are illustrative and can vary in alternative example embodiments. For example, the radio device 200 may include more, less, or different chipsets in alternative example embodiments. In particular, the radio device 200 may not include the Wi-Fi chipset 220 if the radio device 200 does not include Wi-Fi radio connectivity/functionality; the radio device 200 may not include the BLE chipset 235 if the radio device 200 does not include BLE radio connectivity/functionality; and the radio device 200 may not include the UWB chipset 250 if the radio device 200 does not include UWB radio connectivity/functionality. In addition, as would be recognized by a person of ordinary skill in the art, the radio device 200 may include one or more additional components, such as a network interface to provide an Ethernet connection, which are not depicted in FIG. 2 for purposes of simplicity.

Figure 3:
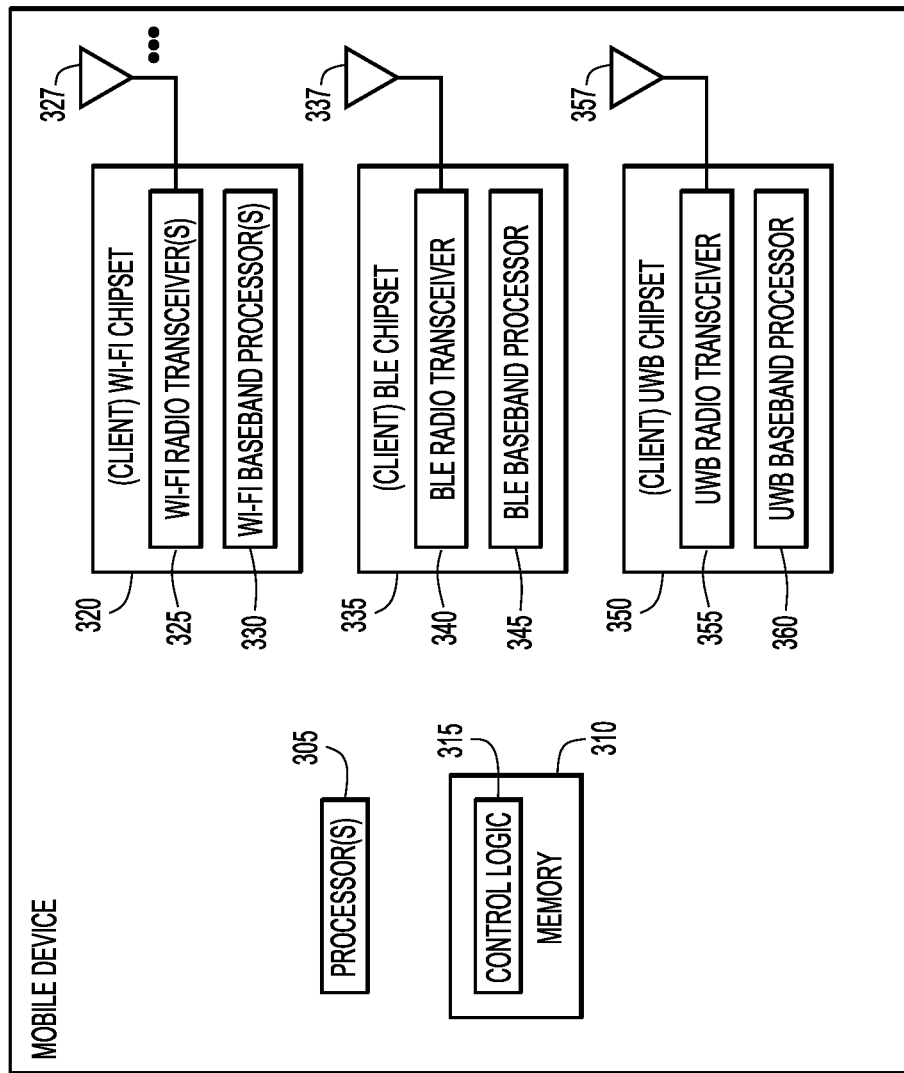
FIG. 3 is a block diagram of a mobile device configured to participate in the techniques presented herein, according to an example embodiment.

Referring to FIG. 3, FIG. 3 is a block diagram of a mobile device 300, according to an example embodiment. As would be appreciated by a person of ordinary skill in the art, the mobile device 300 includes chipsets similar to the chipsets of a radio device or access point, though with configurations for client-side operations and mobile device/battery-powered use cases. In particular, as with the radio device 200 described above in connection with FIG. 2, the mobile device 300 may include any combination of a Wi-Fi chipset 320 for providing Wi-Fi radio connectivity/functionality, a BLE chipset 335 for providing BLE radio connectivity/functionality, and a UWB chipset 350 for providing UWB radio connectivity/functionality, with the Wi-Fi chipset 320 including one or more Wi-Fi radio transceivers 325, antenna(s) 327, and one or Wi-Fi baseband processors 330, the BLE chipset 335 including a BLE radio transceiver 340, antenna(s) 337, and a BLE baseband processor 345, and the UWB chipset 350 including a UWB radio transceiver 355, antenna(s) 357, and a UWB baseband processor 360. The mobile device 300 also includes one or more processors 305 (e.g., microprocessor(s) and/or microcontroller(s)) and a memory 310 that stores control logic 315.

As would be understood by a person of ordinary skill in the art, the features and functionality of the mobile device 300 are illustrative and can vary in alternative example embodiments. For example, as with the radio device 200 depicted in FIG. 2, the mobile device 300 can include more, less, or different components in alternative example embodiments.

Figure 4:
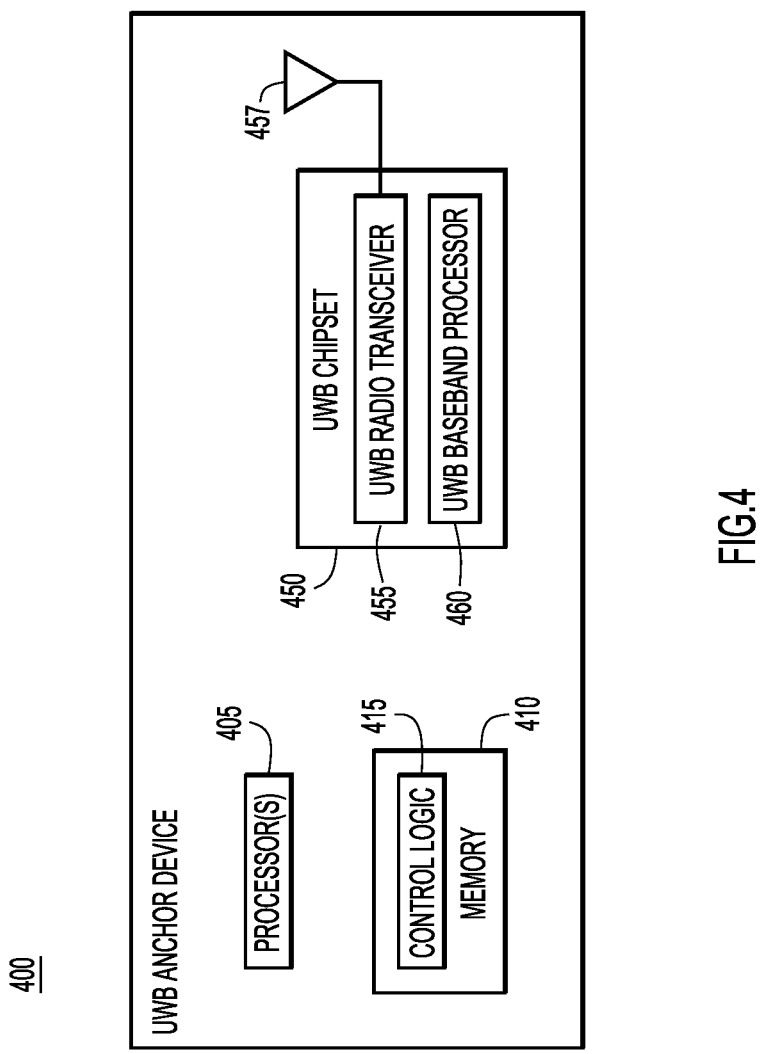
FIG. 4 is a block diagram of a UWB anchor device configured to participate in the techniques presented herein, according to an example embodiment.

Referring to FIG. 4, FIG. 4 is a block diagram of a UWB anchor device 400, according to an example embodiment. The UWB anchor device 400 can be, for example, a stand-alone UWB anchor device or a peripheral UWB anchor device. Accordingly, the UWB anchor device 400 may include some, but not all, of the features depicted in FIGS. 2 and 3 for example radio device 200 and mobile device 300, respectively. In particular, while the UWB anchor device 400 includes a UWB chipset 450 (with a UWB radio transceiver 455, antenna(s) 475, and UWB baseband processor 460), as well as one or more processors 405 (e.g., microprocessor(s) and/or microcontroller(s)) and a memory 410 that stores control logic 415, the UWB anchor device 400 does not include a Wi-Fi chipset or BLE chipset.

However, the UWB anchor device 400 may include these features, and/or other features not depicted in FIG. 4, in alternative example embodiments. For example, the UWB anchor device 400 can include additional communication capabilities beyond UWB, such as BLE wireless communication capabilities and/or wired communication capabilities, in alternative example embodiments. In addition, as noted above, the UWB anchor device 400 (or functionality thereof) may be integrated in, or connected to, a radio device, such as the radio device 200, which may include the same or different components than those depicted in the UWB anchor device 400 of FIG. 4.

As noted above, presented herein are techniques in which the infrastructure (any combination of the APs, UWB anchors, controller, and/or location server) can trigger UWB ranging on a client/mobile device. The result from the UWB ranging can be shared between the infrastructure and the mobile device. The infrastructure triggering techniques provided herein may involve three phases of operations including a readiness phase, a broadcasting phase, and a unicast phase.

Generally, the readiness phase operations may involve a client learning that UWB ranging is available for a venue or location and the broadcasting phase operations may involve enabling a client to perform UWB ranging. Generally, the unicast phase operations may involve individual client instructions for various use cases. Various operations that may be performed for each phase are discussed in further detail below with reference to FIGS. 5, 6A, 6B, 6C, 6D-1, 6D-2, and 7.

Figure 5:
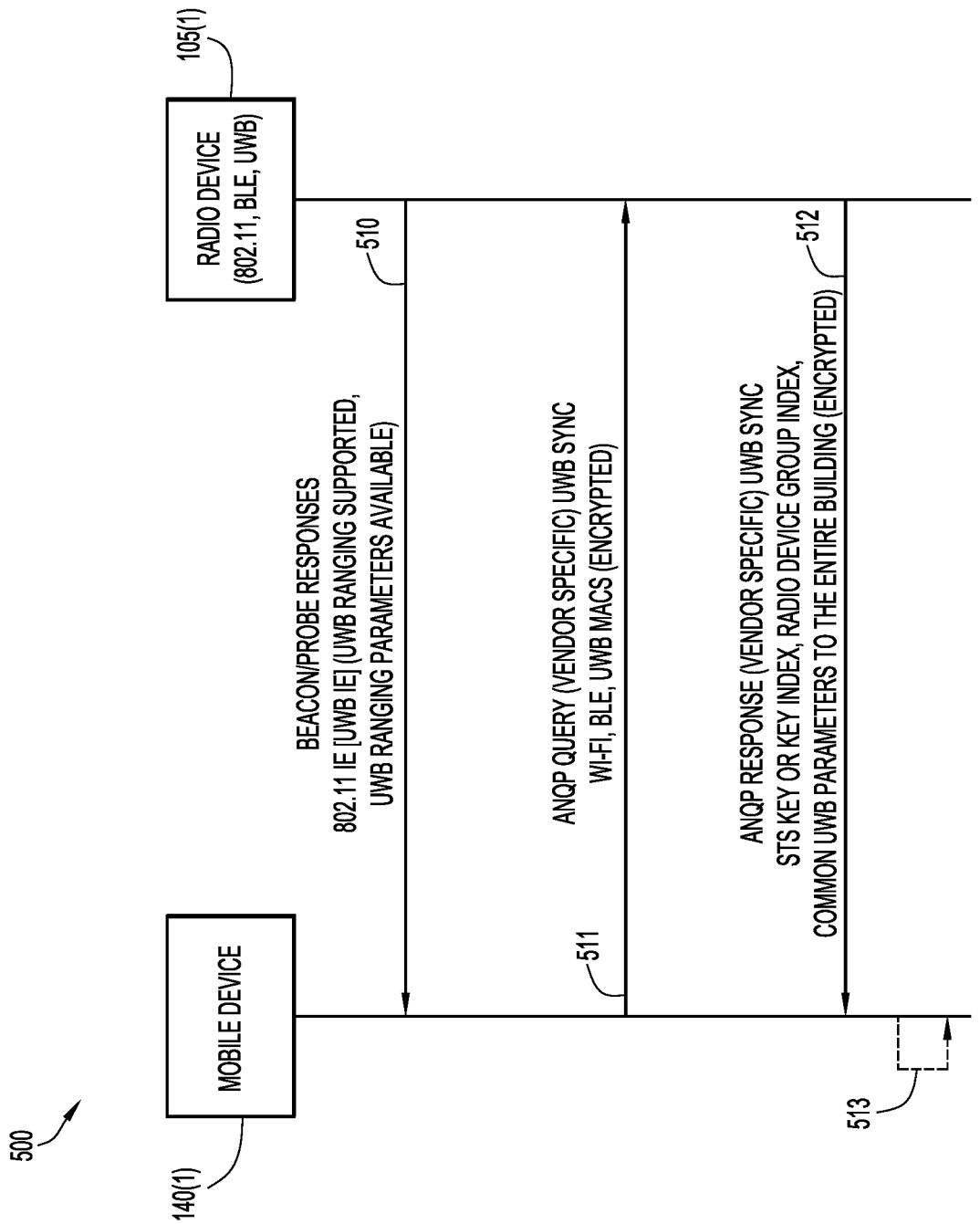
FIG. 5 is a message sequence diagram illustrating a call flow associated with readiness phase operations that may be utilized to trigger UWB ranging for a mobile device utilizing the system of FIG. 1, according to an example embodiment.

Referring to FIG. 5, FIG. 5 is a message sequence diagram illustrating a call flow 500 associated with readiness phase operations that may be utilized to trigger UWB ranging for a mobile device utilizing the system of FIG. 1, according to an example embodiment. Consider for FIG. 5 that mobile device/STA 140(1) has entered geographic area 101 (e.g., a venue) including radio device 105(1), which, as illustrated in FIG. 1 includes built-in/integrated: 802.11/Wi-Fi radio connectivity/functionality, BLE radio connectivity/functionality, and UWB radio connectivity/functionality. Various readiness phase operations are described with reference to operations 510, 511, 512, and 513, discussed below.

Generally for the readiness phase, a mobile device/STA/client, such as mobile device 140(1) may learn that UWB ranging is available in a given geographic area or venue (e.g., geographic area 101) and may obtain common ranging parameters for all UWB anchors for the geographic area. The infrastructure may also learn whether the mobile device supports UWB support and the various MAC addresses for the mobile device.

In a high-density scenario, one feature of the readiness phase is that hundreds of mobile devices approaching a same venue entrance (e.g., for a building/arena/etc.) are to learn about UWB support for the venue before getting within UWB ranging distance. As such, techniques herein provide for using a radio technology with a longer RF range than UWB for this phase. 802.11 is used as an example for the embodiment of FIG. 5, however, it is to be understood that any other longer range technologies (longer range than UWB) could be implemented for various readiness phase operations such as, for example, Citizens Broadband Radio Service (CBRS), LTE/nG with location awareness, etc.

For the readiness phase, as shown in FIG. 5 at 510, the radio device 105(1) may send 802.11 probe responses and/or beacons including UWB information via a set of bits in an 802.11 information element (IE), referred to herein as a UWB IE, that may be utilized to signal the following elements:

UWB ranging supported in this geographic area/venue (bit 0); and

UWB ranging parameters available (bit 1)

For example, indicating that both UWB ranging is supported and UWB ranging parameters are available may be signaled as binary '0011' for a 4-bit UWB IE. Signaling to the mobile device 140(1) that UWB ranging parameters are available can be used to trigger the mobile device 140(1) to connect to the radio device 105(1) in order to obtain the ranging parameters. In various embodiments, the UWB IE may be any proprietary or existing IE (e.g., Access Network Query Protocol (ANQP) signaling, etc.). In some instances, ANQP signaling or signaling via a protected channel (e.g., via Opportunistic Wireless Encryption (OWE) or Pre-Association Security Negotiation), can be exchanged with the mobile device 140(1) without performing a full 802.11 association with the radio device 105(1) to trigger the device to exchange one or more action frames with the radio device 105(1) in order to obtain the parameters.

Other variations can be envisioned. For example, for instances in which a radio device signals that UWB ranging is supported for a geographic area/venue but also indicates that UWB ranging parameters are not available, mobile devices may, in some embodiments, be configured to use some default parameters (e.g., as potentially defined through an interoperability organization, such as the fine ranging (FiRa) Consortium or the like). In some embodiments, obtaining such an indication may trigger a mobile device to continue searching for UWB ranging parameters. For example, in some instances only one radio device within an area (which may be an intended anchor for the client) may have UWB ranging parameters in which the mobile device may query multiple radio devices in order to obtain the parameters. In still some instances, such an indication may trigger a mobile device to attempt to obtain the UWB ranging parameters via another radio technology (e.g., BLE, etc.).

Returning to the present example, as 802.11 RF range is longer than UWB RF range, the bits in the 802.11 IE can be detected by approaching mobile devices, such as mobile device 140(1), before the mobile device is within UWB ranging distance. A special provision is made during broadcasting phase operations, discussed below with reference to FIG. 7, for mobile devices that may have Wi-Fi disabled.

As shown at 511, the mobile detects the UWB IE and sends an Access Network Query Protocol (ANQP) query of a type indicating UWB synchronization (sync) query. In various embodiments, the UWB type can be indicated using a vendor specific format or using an ANQP query type that may be set via an 802.11 standards-defined number/value that may identify the query type and its associated response, as well as additional parameters/fields that may be utilized for the query/response. ANQP is used as an example for the embodiment of FIG. 5 as ANQP is easy to implement above the Layer 2 (L2) driver by any mobile device operating system (OS), however, it is to be understood that another query vehicle (e.g., action frame, etc.), potentially a vendor specific query, may be utilized to produce the same outcome to obtain, through a frame exchange, UWB parameters by the mobile device 140(1). For example, in one embodiment, the mobile device 140(1) may first initiate a secure link to the radio device 105(1) (e.g., via OWE or PASN). In another embodiment, the mobile device 140(1) and the radio device 105(1) may already have pre-existing keying material to secure communications.

For either embodiment, the mobile device 140(1) query may include:
- A request for UWB parameters for the geographic area (venue); and
- The UWB MAC address for mobile device 140(1), the BLE MAC address for mobile device 140(1), and the 802.11 (burned-in) MAC address for the mobile device 140(1) (in case the mobile device 140(1) uses a randomized MAC at this phase). These MAC addresses may be utilized by the radio device 105(1) to identify the mobile device 140(1) across multiple radio technologies and also return UWB ranging and position parameters/information to the appropriate mobile device.

Although the embodiment of FIG. 5 illustrates that mobile device 140(1) sends the ANQP query at 511 in response to obtaining a beacon or probe response from radio device 105(1), in some embodiments, a mobile device may perform the ANQP query upon detecting a new network even if the network has not signals UWB support in a beacon or probe response.

Upon obtaining the query at 511, the radio device 105(1) transmits a reply, as shown at 512, via an ANQP UWB sync response, which includes various encrypted parameters/information, as discussed below. It is to be understood that the response vehicle may also be another type/protocol, potentially vendor specific.

In at least one embodiment, the response at 512 includes UWB ranging parameters, which may include a novel or unique radio device group index, and any common UWB ranging parameters to be used with all UWB anchors in the group. In at least one embodiment, the response may also include a secure training sequence (STS) key or key index for the group that may be used to encrypt the ranging information/data when running subsequent UWB ranging exchanges for the mobile device 140(1). Essentially, the STS provides a unique hash, which enables a mobile device to determine that it is not ranging against a rouge anchor or an anchor for an incorrect anchor group.

The radio device group index uniquely identifies the UWB anchors in a corresponding group for the geographic area/venue using the provided STS value. Thus, the radio device group information allows the mobile device 140(1) to know which key to use to encrypt ranging information/data when ranging against several neighboring groups of UWB anchors. In some instances there may be multiple groups of UWB anchors configured for a geographic area. Consider, in one example, a shopping mall having multiple stores in which each store includes a corresponding group of UWB anchors. In this example, a group index corresponding to the UWB anchors for each store may be statically formed (e.g., store 1 corresponding to group 1, store 2 corresponding to group 2, etc.), which may help to avoid one group consuming resources allowed for another group (e.g., as each UWB entity has a maximum amount of energy allowed per second/minute, etc.). In another example, groups may be dynamically formed. Consider an example in which a first client, Client 1, is to range against a first group, Group 1. In this example, if a second client, Client 2, hears a Group 1 response (and not being able to read/decipher) the STS part, will know that a corresponding UWB ranging frame is for another client—Client 1. Other variations can be envisioned.

In at least one embodiment, the common UWB ranging parameters for all UWB anchors in the group may include preamble type, expected modulation, and UWB ranging mode (e.g., hybrid, TDoA, etc.). In some embodiments, common UWB ranging parameters may include any common physical layer (PHY) parameters, MAC parameters, and/or any other header information. For example, a UWB ranging frame header includes the preamble and the Start of Frame Delimiter (SFD), both making up the Sync Header (SHR), followed by the Physical Header (PHR), then followed by the payload, which is the MAC header with a long or short address. In various embodiments, the STS can be included within different fields of this structure.

In at least one embodiment, the response at 512 may also include an index, which assigns the mobile device 140(1) to a ranging group, referred to herein as a 'ranging group index'. In at least one embodiment, the ranging group index may be utilized to determine timing for performing UWB ranging such that a mobile device may determine its slot assignment to perform UWB ranging using the ranging group index. Thus, the ranging group index can be used to organize UWB ranging for mobile devices. For example, all mobile devices in one area may assigned to a first ranging group index (index 1), and receive from the anchors allocated to that zone a blink (e.g., UWB transmissions, sent one anchor after the other). Mobile devices in nearby area may hear some of these blinks, but the blinks would be insufficient to provide enough ranging data to the mobile devices. By utilizing the ranging group index, these nearby mobile devices do not need to process group index 1 blinks that they hear. In another case, mobile devices (e.g., 4 clients) within a ranging group can be instructed by an anchor to send a UWB ranging transmission on a next slot. By grouping clients and allocating slots, collisions can be avoided.

For instances in which there can be multiple radio device groups, information for each group can be included in the response at 512, or multiple responses may be sent, each containing information for each radio device group.

In some embodiments, obtaining the response from the radio device 105(1) at 512 may trigger the mobile device 140(1) to enable its BLE radio, as shown at 513. For example, if the BLE radio is currently disabled for the mobile device 140(1), obtaining the response from radio device 105(1) can trigger the mobile device to enable its BLE radio.

Figure 6A:
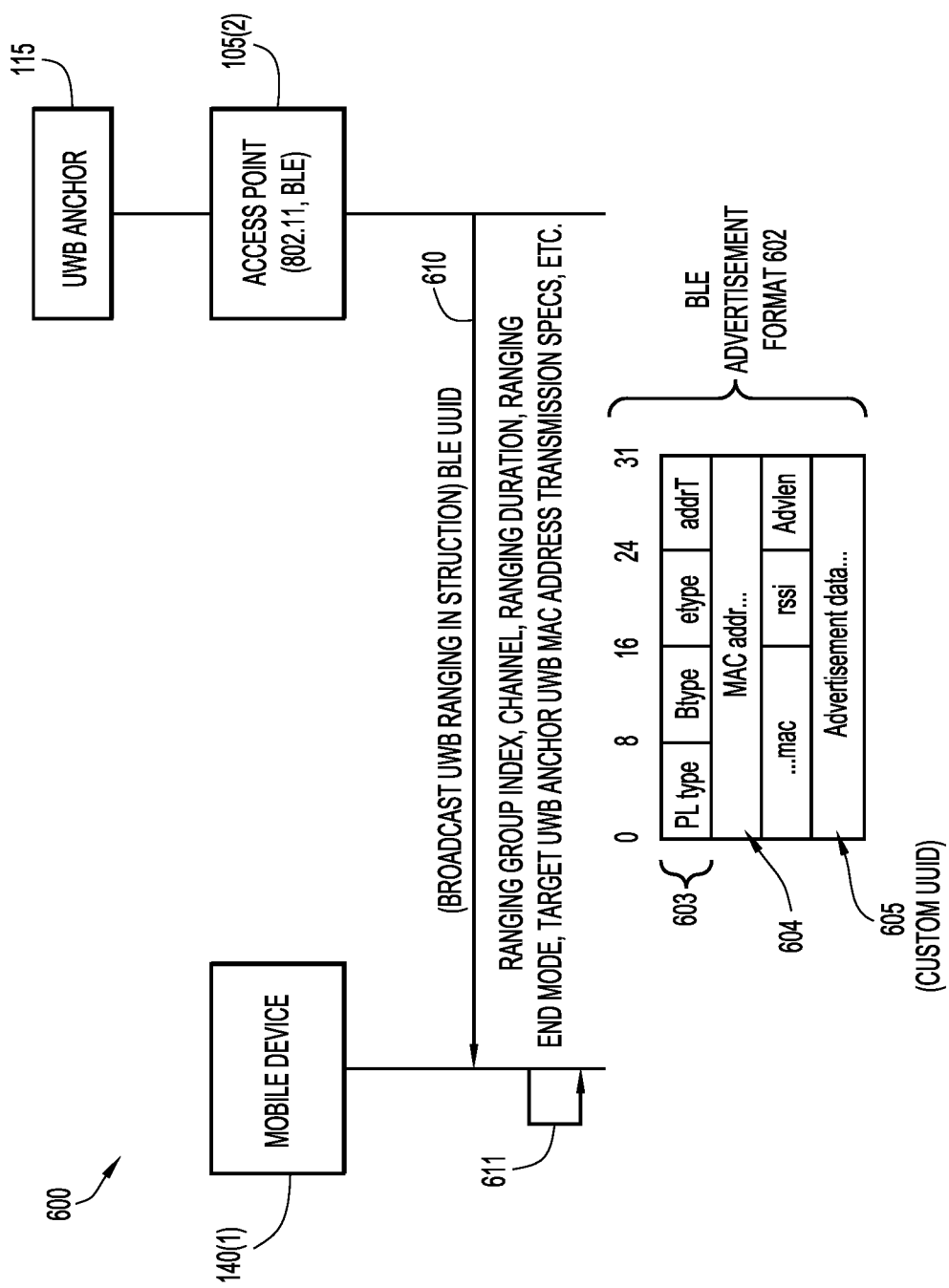
FIG. 6A is a message sequence diagram illustrating a call flow associated with broadcast phase operations that may utilized to trigger UWB ranging for a mobile device utilizing the system of FIG. 1, according to an example embodiment.

Turning now to broadcasting phase operations, FIG. 6A is a message sequence diagram illustrating a call flow 600 associated with broadcasting phase operations that may be utilized for triggering UWB ranging for a mobile device utilizing the system 100 of FIG. 1, according to an example embodiment. The broadcasting phase operations are described with reference to various Features A, B, C, D, E, F, G, H, and I, discussed below, in connection with FIGS. 6A, 6B, 6C, 6D-1, and 6D-2.

Referring to FIG. 6A, FIG. 6A includes the mobile device 140(1), which has received the parameters/information following the readiness phase operations as discussed above for FIG. 5. FIG. 6A also includes a UWB anchor, such as radio device 105(2), which includes peripheral UWB anchor device 115 connected thereto. Various examples discussed for the broadcasting phase operations are described with reference to utilizing a BLE broadcast to trigger UWB ranging for mobile device 140(1); however, it is to be understood that UWB ranging may also be triggered utilizing any other radio communication other than UWB radio communications, such as 802.11/Wi-Fi radio communications.

Feature A: In the broadcasting phase, consider that the mobile device 140(1) is within range of one or many UWB anchors for a particular area within the venue/geographic area 101 in which multiple mobile devices (e.g., mobile devices 140(1)-140(n)) may be expected to perform UWB ranging. A goal of the broadcasting phase is to enable or trigger all mobile devices within a particular area of a venue to perform UWB ranging through activating their UWB chipset and performing UWB ranging against a target UWB anchor, which may be selected by location server 190.

For example, the location server 190 can select a master or target UWB anchor, such as radio device 105(2), and instruct the target UWB anchor to initiate a UWB ranging procedure with a mobile device, such as mobile device 140(1). In one example, the location server 190 can estimate a coarse location for mobile device 140(1) using a non-UWB localization technique (e.g., lateration, AoA, etc.) and select the target UWB anchor based on the coarse location. In another instance, a target UWB anchor may be selected based on characteristics of a geographic area. For example, a target anchor placed in a high density area (e.g., an auditorium) may broadcast ranging parameters providing short range but low energy consumption (allowing a large number of slow moving devices to perform ranging with the target anchor), while target anchors in a hallway may provide longer ranging parameters (to account for lower client density and potentially sparser anchor density).

The broadcasting phase incorporates several considerations:
  It is expected that a mobile device will have a BLE radio, and that the radio may either be always on or can be enabled for a given venue (e.g., as discussed above at 513 for FIG. 5).
  It is expected that the BLE RF range is approximatively the same as the UWB RF range. In an alternative in which information to trigger UWB ranging may be broadcast using another radio technique, such as 802.11/Wi-Fi, it can be envisioned that a mobile device may be configured to expect an indication at a shorter range to trigger UWB ranging (e.g., 'UWB available when detected Wi-Fi signal strength is approximately −58 decibel-milliwatts (dBm)). Other variations can be envisioned.
  As much as possible, UWB should only be used for the UWB ranging phase, as consuming airtime for other exchanges dramatically reduces the number of concurrent mobile devices that can range from the same general area (as with UWB, all mobile devices and anchors are expected to be on the same channel and regulations set a hard limit on the amount of energy per minute sent by a given system).

Feature B: In at least one embodiment, the broadcasting phase operations may utilize BLE with a novel Universally Unique Identifier (UUID) signaling a broadcast UWB ranging instruction, as shown at 610 for FIG. 6A, including UWB ranging instruction information provided via advertisement data fields. FIG. 6A includes an example BLE advertisement format 602 including a preamble portion 603, an access address portion 604, and an advertisement data portion 605 that can be utilized to carry the custom BLE UUID/UWB ranging instruction information. The preamble portion 603 and the access address portion 604 may be represent the header for the BLE advertisement format 602. The Btype field of the preamble portion 603 is used to indicate a unicast transmission or a broadcast transmission type (e.g., 0 or 1, respectively), which can be set to the broadcast type for signaling the UUID. The AddrT field of the preamble portion 603 can include the MAC address for the transmitting radio device 105(2).

Feature C: The UUID can be sent to a broadcast address (via the access address portion 604) and is of type 'custom' in which each bit of the payload for the advertisement data portion 605 contains details of a UWB ranging instruction including, but not limited to, UWB channel number coded over 40-bits, ranging duration (in seconds) coded over 4-bits, ranging end mode coded over one or more bits, ranging group index (e.g., coded over 4-bits), and target UWB anchor UWB MAC address (short or long) coded over multiple bits. In various embodiments, the target UWB anchor UWB MAC address can be set to a broadcast address (all F's) or set to the target destination client MAC address (e.g., the UWB MAC address for the target UWB anchor). The UUID can be short (2 bytes) or long (16 bytes) depending on implementation, which may vary, for example, based on how many common UWB ranging parameters may have been shared during the readiness phase operations (e.g., via a 802.11/Wi-Fi exchange). In some instances, the radio device group index can be carried in the access address portion Feature D: The BLE UUID may also include transmission specifications (specs), such as an interval and slot count values, which inform all mobile devices of the interval between two BLE broadcasts and the number of slot times within these intervals. The interval and slot count values are discussed in further detail below with reference to FIGS. 6B and 6C. In various embodiments, the transmission specs may include any parameters that may not be included in general parameters for an entire geographic area/venue. For example, in some instance the transmission specs may contain an STS index, PHY parameters such as a pulse repetition frequency (PRF), the channel for a given anchor (and/or potentially its neighbor anchors), the FSD ID, etc. Thus, the transmission specs may include any locally significant parameters that can override any previously obtained general parameters.

Feature E: As shown in FIG. 6A at 611, the mobile device 140(1) stores information from the broadcast and uses the BLE broadcast UUID ranging instruction as a trigger to enable the UWB chipset for the mobile device 140(1) and perform UWB ranging via the target UWB anchor for the duration of the ranging duration value. UWB ranging is discussed in further detail with reference to FIGS. 6D-1 and 6D-2.

Figure 6B:
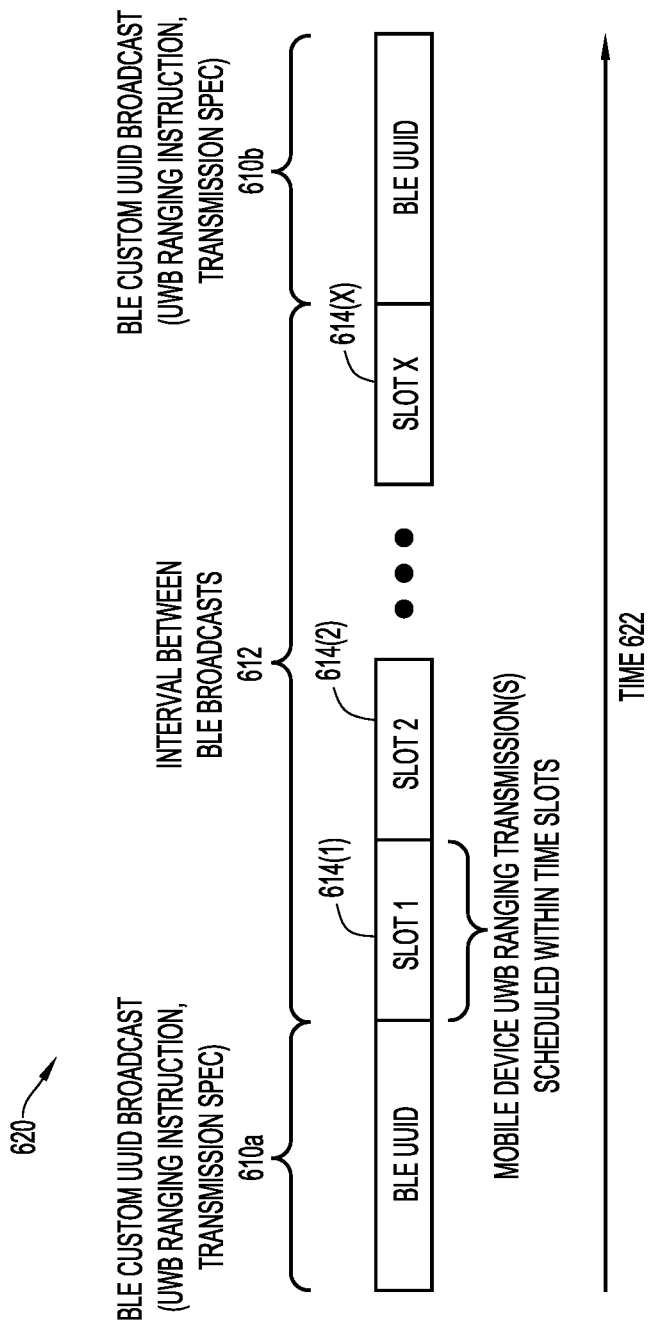
FIG. 6B is a schematic diagram illustrating example details associated with a Time Division Multiple Access (TDMA) access method that may be utilized for techniques presented herein, according to an example embodiment.

In at least one embodiment, techniques herein may facilitate a Time Division Multiple Access (TDMA) access method, as illustrated in FIG. 6B, which is discussed with reference to FIGS. 6A and 6C. FIG. 6B is a schematic diagram 620 illustrating example details associated with the TDMA access method across a time axis 622 in which each BLE broadcast interval 612 (the time between two BLE custom UUID broadcasts, labeled as a first BLE custom UUID broadcast 610a and a second BLE custom UUID broadcast 610b in FIG. 6B) can be divided into time slots 614(1)-614(X). Within each time slot 614, during the interval between to BLE broadcasts, one or more UWB mobile devices 140, such as mobile device 140(1) can be scheduled by the location server 190 to transmit a signal for UWB ranging operations. It should be noted that the BLE broadcast transmission specifications, as noted above at Feature D, do not include the slots themselves but rather indicate the interval 612 between BLE broadcasts 610a and 610b and the number of slots (i.e., slot count value) in that interval 612.

Figure 6C:
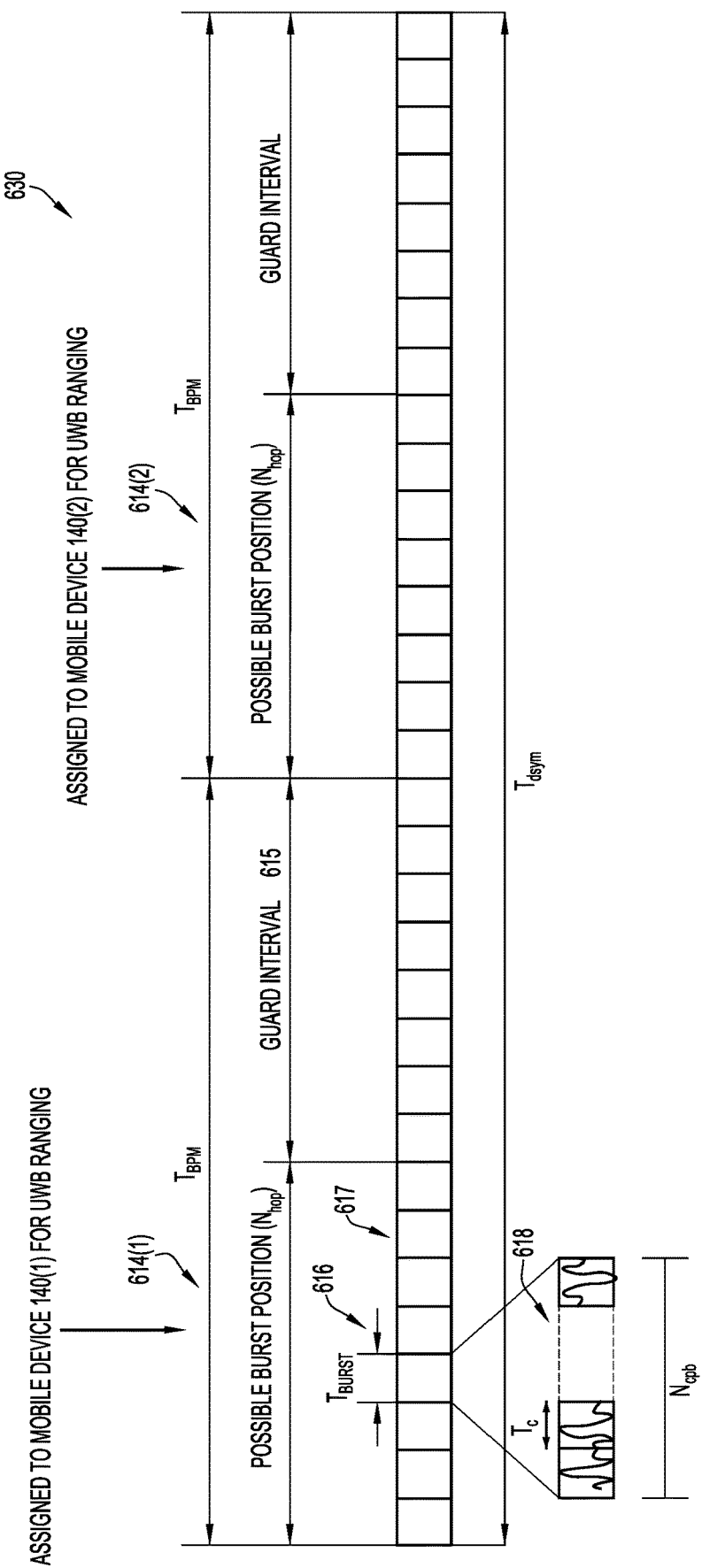
FIG. 6C is a schematic diagram illustrating example details that may be associated with UWB ranging transmissions, according to an example embodiment.

Referring to FIG. 6C, FIG. 6C is a schematic diagram 630 illustrating example details that may be associated with UWB ranging transmissions, according to an example embodiment. Features of FIG. 6C are discussed with reference to features discussed above for FIG. 6B. As shown in FIG. 6C, in one example, the first time slot 614(1) can be assigned by to a first mobile device, such as mobile device 140(1), for UWB ranging and the second time slot 614(2) can be assigned to a second mobile device, such as mobile device 140(2) for UWB ranging. As discussed in further detail below, the ranging group index obtained by a mobile device (e.g., at 512 for FIG. 5 and/or at 610 of FIG. 6) can be used by the mobile device to determine its corresponding slot assignment within which to perform UWB ranging.

The first time slot 614(1) and the second time slot 614(2) are separated by a guard interval 615 (not shown in FIG. 6B). Generally, the guard interval may limit collisions between pulse groups. Each slot 614(1) and 614(2) includes at least one burst 616, which includes one or more burst positions 617. Within each burst position 617, there are different chip indexes or positions 618.

In order to avoid collision between neighboring systems, UWB ranging may utilize a hopping sequence, which means that within each slot, the location server 190 may pick a chip position during which the signal for UWB ranging will be sent. Per the UWB standard, chip position is random. As groups may be small and the protocol implements a PRF, the pulse is repeated over a few slots (each time at random chip position), thus ensuring that if collision occurs, the repeat technique helps to provide that at least one of the repeats will not collide. By changing the chip position used to transmit from one slot to the next, and the frequency center of the pulse, a UWB transmitter minimizes the risk of collision between competing transmitters. However, just like with other hopping techniques, this pseudo-randomization may cause collisions faster than an ordered transmission. By limiting the number of mobile devices within the same time slot (between BLE broadcast intervals), techniques herein may limit this issue. However, as the number of mobile devices increases, the issue may re-appear within each time slot.

A UWB signal sent during a burst position 617 generally includes a short-lived pulse. Each pulse includes a relatively wide bandwidth signal (e.g., 499.2 MHz) that is relatively flat (e.g., with low power). Because the pulse is so low power, it may appear narrow in the frequency domain and in the time domain. In some instances, two different mobile devices could be assigned the same burst position 617, and their pulses may be: 1) on different subsets of the signal and, thus, detectable from each other, or 2) slightly misaligned in time and, thus, able to coexist without destructive collision. Accordingly, the location server 190 can spread devices into different slots, at a narrower time resolution level, and the location server 190 can assign devices to different burst positions in the same slot. For example, even if two devices are assigned the same burst position 617, they may be assigned different chip indexes or positions 618 and, therefore, avoid collisions.

For the example discussed for Feature E, the trigger obtained by a mobile device, such as mobile device 140(1), may be obtained as a request from the infrastructure in which the mobile device 140(1) obtains a BLE broadcast including the BLE UUID from a radio device as shown at 610. However, in at least one embodiment if the user uses a location-application configured for a mobile device (e.g., a mapping application, etc.), the application may receive the UUID as a signal that UWB ranging is also possible in a given area; thus, indicating to the application that high accuracy location has become possible in which UWB ranging can be initiated by the application.

Feature F: Any mobile devices that may have had their Wi-Fi chipset/radio disabled during the readiness phase, as discussed above for FIG. 5, may still discover UWB ranging availability and trigger UWB ranging for a geographic area based on obtaining the BLE broadcast UUID. In at least one embodiment, such mobile devices that may learn of UWB ranging availability via a broadcast UUID may utilize BLE unicast phase operations, as discussed below for FIG. 7, to learn UWB availability/ranging parameters and participate in a UWB ranging group for a geographic area.

Feature G: In one embodiment for performing UWB ranging, a mobile device, such as mobile device 140(1), may be allocated windows based on its ranging group index and utilize a standard Clear Channel Assessment (CCA) mode 4, ALOHA within the windows in order to perform UWB ranging against the target UWB anchor as signaled via the BLE UUID broadcast (e.g., using the target UWB anchor MAC address).

In another embodiment, the CCA may utilize the TDMA access method as discussed above. In this mode, the mobile device may use its ranging group index to determine how many time slots between the BLE UUID broadcast interval (612, as shown in FIG. 6B) the mobile device is to wait before running ALOHA CCA and then start UWB ranging. The mobile device can obtain the ranging group index through an 802.11 response via readiness phase operations (as discussed at 512 for FIG. 5) or through unicast phase operations (discuss in further detail with reference to FIG. 7, below). The TDMA access mode may allow the location server 190 to increase the density of ranging mobile devices by spreading the request in an organized manner based on the broadcast interval between BLE transmissions.

Simulations indicate that generic ALOHA allows for 18.6% efficiency such that beyond 18.6% airtime utilization, collisions start occurring in more than 97% of cases, while the TDMA mode may increase efficiency to 65%. Thus, the second mode may be preferred in high-density environments.

Feature H: Mobile device UWB ranging can utilize several ranging modes currently known in the art or hereafter developed, which may include, but not be limited to, a Two-Way Ranging (TWR) type (e.g., request to UWB anchor, response from the anchor, repeat with next anchor), a Time Difference of Arrival (TDoA) type (e.g., a single blink from the STA, received by all neighboring anchors), and/or the like. In TWR, TDoA, or a hybrid mode, the target UWB anchor returns to the mobile device a computed distance or a computed mobile device position.

Figures 2, 6D:
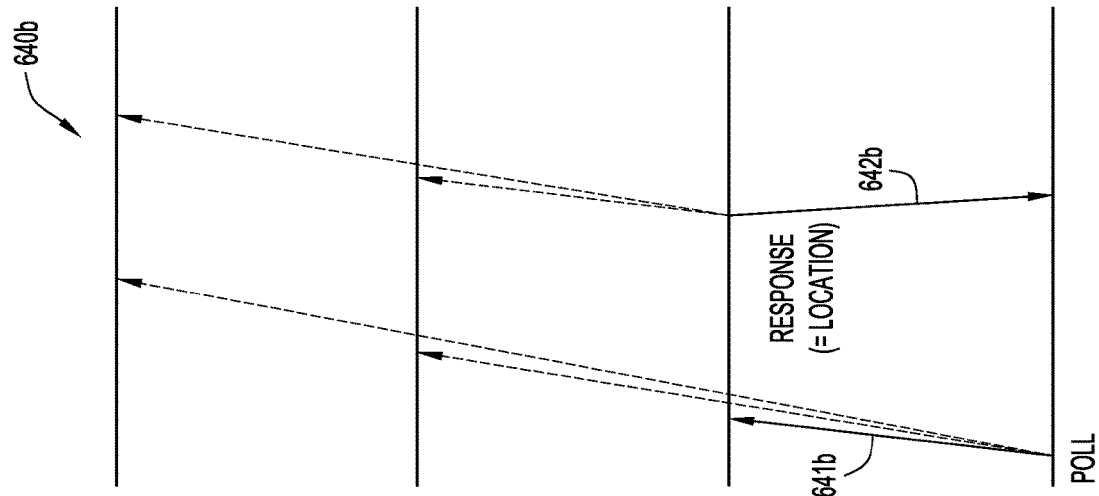
Figures 1, 6D:
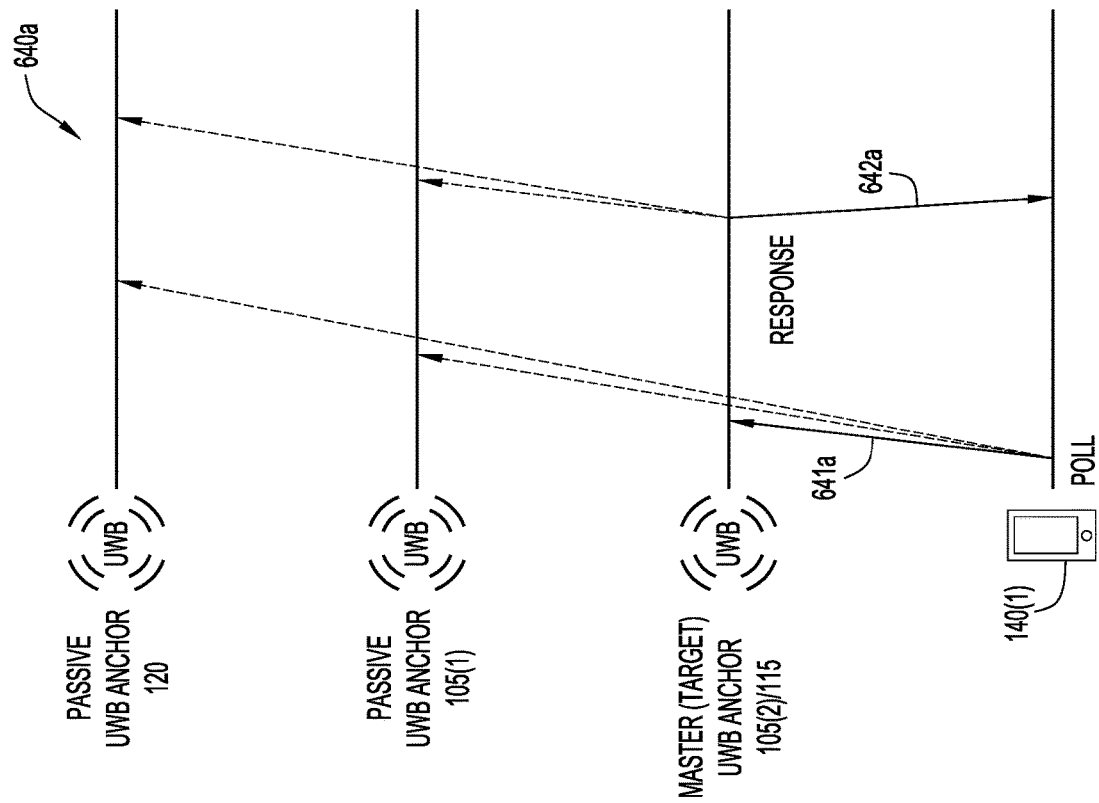

FIGS. 6D-1 and 6D-2 are schematic diagrams 640a and 640b illustrating example details associated with UWB ranging operations that may be performed, according to an example embodiment. FIGS. 6D-1 and 6D-2 include radio device 105(2), which for the present example is identified as the target UWB anchor with which a mobile device 140(1) is to perform UWB ranging. FIGS. 6D-1 and 6D-2 further illustrates a first passive UWB anchor, which for the present example may be radio device 105(1), and a second passive UWB anchor, which for the present example may be stand-alone UWB anchor device 120.

The mobile device 140(1) may perform two-way ranging with one master or target UWB anchor, such as radio device/peripheral UWB anchor device 105(1)/115 via a ranging signal 641a, as shown in FIG. 6D-1, in which all anchors receive the ranging signal 641a transmitted from the mobile device 140(1) but only the master (target) anchor responds, as shown at 642a. The passive anchors may compute TDoA, however, only the master/target UWB anchor responds to the mobile device. The passive UWB anchors and may be synchronized using the master/target UWB anchor response. The location server 190 may combine feedback from all of the UWB anchors to compute the mobile device 140(1) location.

Consider various ranging operations that may be performed based on different ranging modes. In a strict TWR mode, one side, client or anchor, say, for the example, mobile device 140(1) sends a message at time 't', with an instruction to reply at a time 't+n'. The target UWB anchor receives the message, waits n, and then replies. The mobile device now knows 't', the time of arrival 't1' of the response, and that the target UWB anchor waited n, so the mobile device can evaluate the time of flight (t1−t−n)/2 to the target UWB anchor. If the mobile device needs to know the anchor location, this can be shared over BLE, Wi-Fi, UWB, from an out of band map, etc. The mobile device can repeat this process with multiple anchors in order to determine its range to all of the anchors. In this mode, the mobile device can use a location technique, which can be a three sphere intersection technique (e.g., range to 3 anchors form 3 spheres, the technique finds the intersection), can be a least square error from 4 or more ranges, can be an iterative method like Kalman filter or alpha beta filter, or the like.

In a strict TDOA mode, the mobile device (for example) can send a blink at regular intervals. A master/target UWB anchor can also send a sync at regular intervals, with a timestamp. Each anchor can forward to the location server 190 the time when the blink was received and the time when the sync was received. By knowing the sync transmit (Tx) time, receive (Rx) time, and the distance to the anchor, the location server can establish the clock drift of each anchor. This allows the system to bring every anchor to the same common clock. Then, with the blink Rx time on different anchors, the location server 190 can compute the time difference of arrival between anchor pairs, each of TDOA forming a hyperbola. The location server 190 then uses a method to find the best intersection location for these multiple hyberbolas, this can again be a least square, the phase transform (PHAT) method, or the like.

The hybrid mode is in between the strict TWR and strict TDOA modes in which TWR is performed to the master/target UWB anchor and the other anchors hear the client Tx and the anchor Tx. The time of the Rx is used as a sync, the client Tx as the blink. This also results in hyperbolas.

Thus, in one example, upon obtaining a subsequent UWB ranging transmission from the mobile device 140(1), as shown at 641b for FIG. 6D-2, and once the mobile device 140(1) location is obtained by the master/target UWB anchor from the location server 190, the master (target) UWB anchor returns location information to the mobile device 642b indicating the mobile device location, as shown in FIG. 6D-2. In various embodiments, location information for a mobile device location may be expressed as latitude and longitude coordinates, three-dimensional (3D) Cartesian coordinates, two-dimensional (2D) coordinates (e.g., in reference to a floor plan, such as 'x, y from northwest corner or other landmark), and/or the like.

Feature I: At the end of the ranging period, the mobile device 140(1) can stop UWB ranging based on BLE UUID ranging and end mode parameters. In various embodiments, an end mode can be set to a mandatory stop (e.g., a mobile device is to stop ranging in order to leave space to other mobile devices in which the stop mode can be accompanied with a comeback value allowing the mobile device to restart after the comeback period) or an optional stop (e.g., the mobile device can stop ranging but can continue if a high accuracy is desired).

Although a readiness phase ANQP response may be utilized to instruct a mobile device about common UWB ranging parameters, such as the mode to use for UWB ranging, as different ranging zones may have different criteria, a BLE broadcast or the like may also be utilized to signal common UWB ranging parameters to a mobile device. For instances in which a mobile device first receives common UWB ranging parameters via Wi-Fi and subsequently receives parameters via a BLE transmission, the BLE data may override the data obtained via a Wi-Fi transmission.

Thus, as illustrated via FIGS. 6A, 6B, 6C, 6D-1, and 6D-2, UWB ranging for a mobile device can be triggered using various BLE broadcast operations. However, in some instances, BLE unicast operations may also be utilized to trigger UWB ranging for a mobile device, as discussed in further detail below with reference to FIG. 7.

Figure 7:
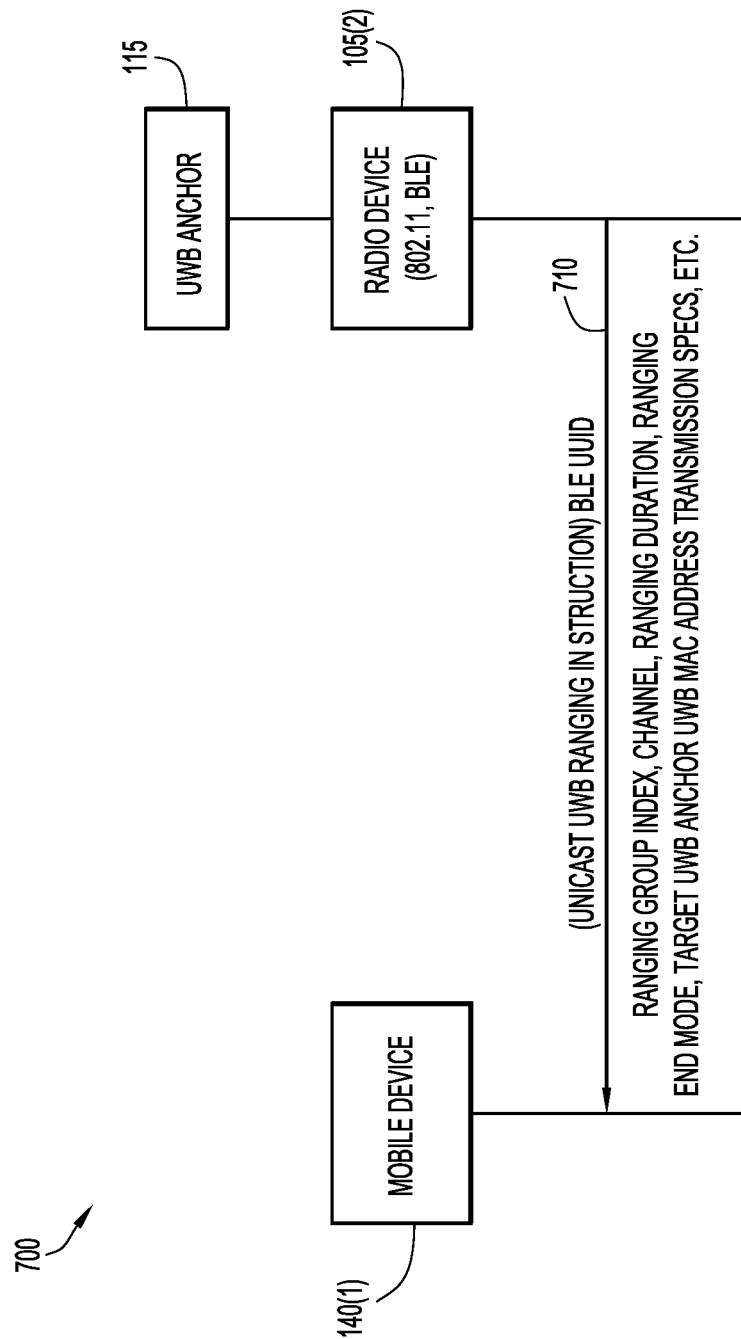
FIG. 7 is a message sequence diagram illustrating a call flow associated with unicast phase operations that may be utilized for triggering UWB ranging, according to an example embodiment.

Referring to FIG. 7, FIG. 7 is a message sequence diagram illustrating a call flow 700 associated with unicast phase operations that may be utilized for triggering UWB ranging for a mobile device, according to an example embodiment. FIG. 7 includes mobile device 140(1) and radio device/peripheral UWB anchor device 105(2)/115. Various unicast phase operations are described with reference to Features J and K, discussed below.

As mobile devices move within a geographic area (e.g., venue/building/etc.), there may be areas or instances in which individual mobile device cases may be addressed such as, for example, zones in which a particular mobile device location is unclear, instances in which different radio technologies may provide different results, etc. There may also be instances in which a mobile may have had its Wi-Fi radio disabled upon entering a venue and, thus, did not obtain the parameters as discussed above at 512 for FIG. 5.

Feature J: In one embodiment of unicast phase operations, mobile devices that discover UWB ranging as per Feature C via a BLE broadcast UUID can send a BLE pairing query to the BLE MAC address for the radio device from which the broadcast UUID was obtained (the BLE MAC address is included in the broadcast UUID) and a secure connection can be established between the mobile device and the radio device. Within the session, the radio device can provide to the mobile device the parameters/information as discussed above at 512 including radio device group index, ranging group index for the mobile device, and/or common UWB ranging parameters (e.g., preamble type, expected modulation, UWB ranging mode, etc.) and the radio device can obtain the mobile device MAC addresses (e.g., UWB MAC, etc.). Thus, in this embodiment, the UWB ranging parameters obtained via the BLE unicast UUID in combination with UWB ranging instruction information obtained via the BLE broadcast UUID can be utilized by the mobile device to perform UWB ranging with a target UWB anchor.

For a case in which a specific treatment is involved for a mobile device, such as a need to give specific parameters to the mobile device, operations for Feature J may not occur.

Feature K: For a case in which a specific treatment is involved for a mobile device, a variation of Features C, D, and D (as discussed above) may be utilized, as shown at 710 for FIG. 7, to send a unicast BLE UUID ranging instruction to the mobile device BLE MAC address (e.g., the mobile device may have communicated all its MACs during the readiness phase or it could have established a BLE connection). In various embodiments, the BLE unicast UUID ranging instruction can include radio device group index, ranging group index for the mobile device, channel information, start/stop instructions, ranging durations, target UWB anchor UWB MAC address, and any other parameters and/or instructions that may be involved for managing mobile device UWB ranging activity.

Accordingly, the mobile device can obtain the general parameters (e.g., common to a venue, but different from FiRa defaults, for example) and unicast parameters, if any. The order of obtaining the parameters may be varied in any manner, so long as they are obtained before the mobile device starts ranging. Thus, any combination of broadcast and/or unicast operations may be utilized to signal UWB ranging parameters and/or instructions to one or more mobile devices.

Figure 8:
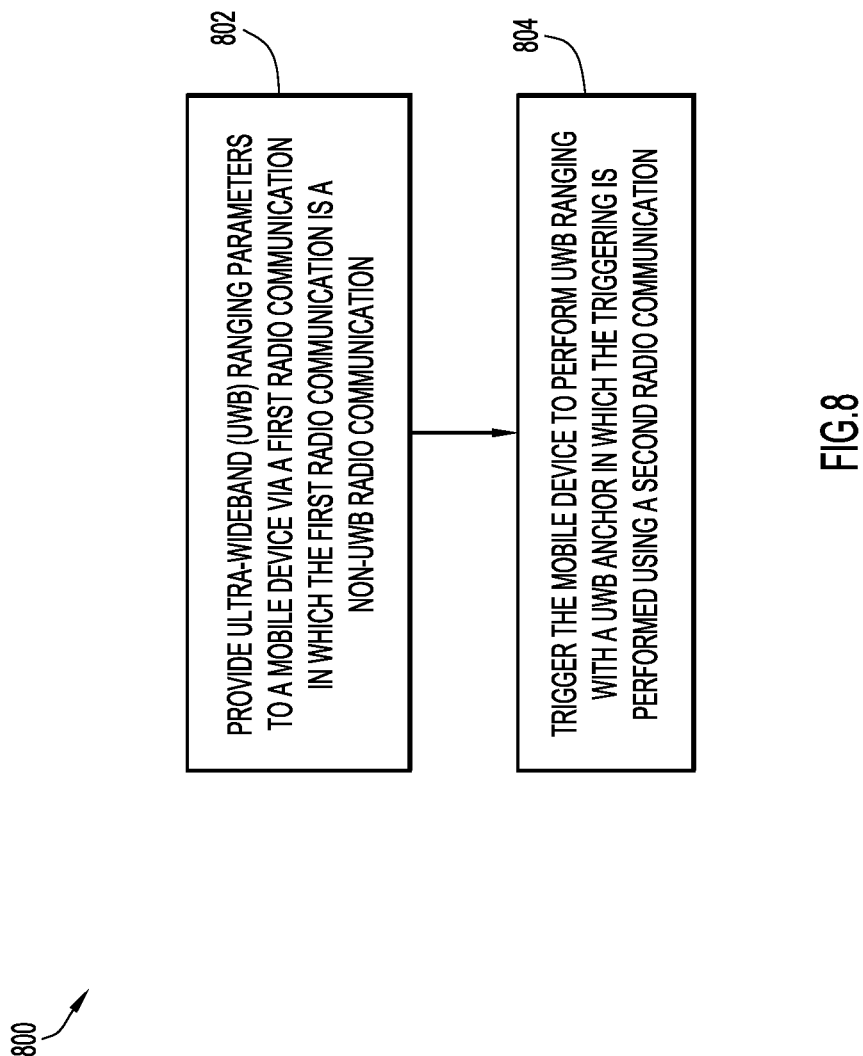
FIG. 8 is a flow chart depicting a method according to an example embodiment.

Referring to FIG. 8, FIG. 8 is a flow chart depicting a method 800 according to an example embodiment. In at least one embodiment, method 800 may be performed by at least one radio device/UWB anchor device having 802.11/Wi-Fi radio communication capabilities/functionality, Bluetooth/BLE radio communication capabilities/functionality, and UWB radio communication capabilities/functionality capabilities.

At 802, the method may include the radio device/UWB anchor providing UWB ranging parameters to a mobile device via a first radio communication in which the first radio communication is a non-UWB radio communication. The UWB ranging parameters can be encrypted. In one instance, providing the UWB ranging parameters to the mobile device triggers the mobile device to enable a Bluetooth radio on the mobile device.

In one embodiment, the first radio communication is an IEEE 802.11 radio communication in which providing the UWB ranging parameters to the mobile device may include providing an IEEE 802.11 transmission to the mobile device indicating support for UWB ranging for a geographical area and indicating an availability of the UWB ranging parameters; obtaining an IEEE 802.11 query from the mobile device for the UWB ranging parameters, wherein the IEEE 802.11 query includes a UWB Media Access Control (MAC) address for the mobile device, an IEEE 802.11 MAC address for the mobile device, and Bluetooth MAC address for the mobile device; and providing an IEEE 802.11 response for the IEEE 802.11 query that includes the UWB ranging parameters. In at least one embodiment, the 802.11 query is an ANQP query and the 802.11 response is an ANQP response including the UWB ranging parameters.

In one embodiment, the UWB ranging parameters may include one or more of a group index identifying a group of UWB anchors for a geographic area, wherein the UWB anchor is a member of the group of UWB anchors for the geographic area; common UWB ranging parameters applicable to all UWB anchors of the group; a ranging group index for the mobile device; and a security key to enable encryption of UWB ranging data exchanged between the mobile device and the UWB anchor.

At 804, the method may include the radio device/UWB anchor triggering the mobile device to perform UWB ranging with a target UWB anchor in which the triggering is performed using a second radio communication. Location information for the mobile device may be sent to the mobile device as a result of the UWB ranging.

In one embodiment, the second radio communication may be a Bluetooth (BLE) radio communication in which the triggering is performed by broadcasting a UUID indicating a UWB ranging instruction to the mobile device. In one instance, the UWB ranging instruction includes a first plurality of bits identifying a UWB channel number, a second plurality of bits identifying a ranging duration value, one or more third bits identifying a ranging end mode UWB (e.g., end mode type); and a fourth plurality of bits identifying a UWB MAC address for the target UWB anchor.

In one embodiment, the second radio communication may be an 802.11 radio communication in which the mobile device may trigger UWB ranging based on the 802.11 radio communication breaching a signal strength threshold.

In one embodiment, the first radio communication is a Bluetooth radio communication in which the UWB ranging parameters are provided to the mobile device via a Bluetooth unicast transmission to the mobile device and the second radio communication is performed prior to the first radio communication. Thus, in some embodiments, the second radio communication can be received by the mobile before the first radio communication. Accordingly, the terms 'first radio communication' and 'second radio communication' do not imply any specific order for the mobile device obtaining the radio communications. The mobile device may obtain the first radio communication and the second radio communication in any order.

In one embodiment, the method may include providing updated UWB ranging parameters to the mobile device via a third radio communication. In one embodiment, the third radio communication may be a Bluetooth (e.g., BLE) radio communication and the updated UWB ranging parameters are provide to the mobile device via a Bluetooth unicast transmission to the mobile device.

Figure 9:
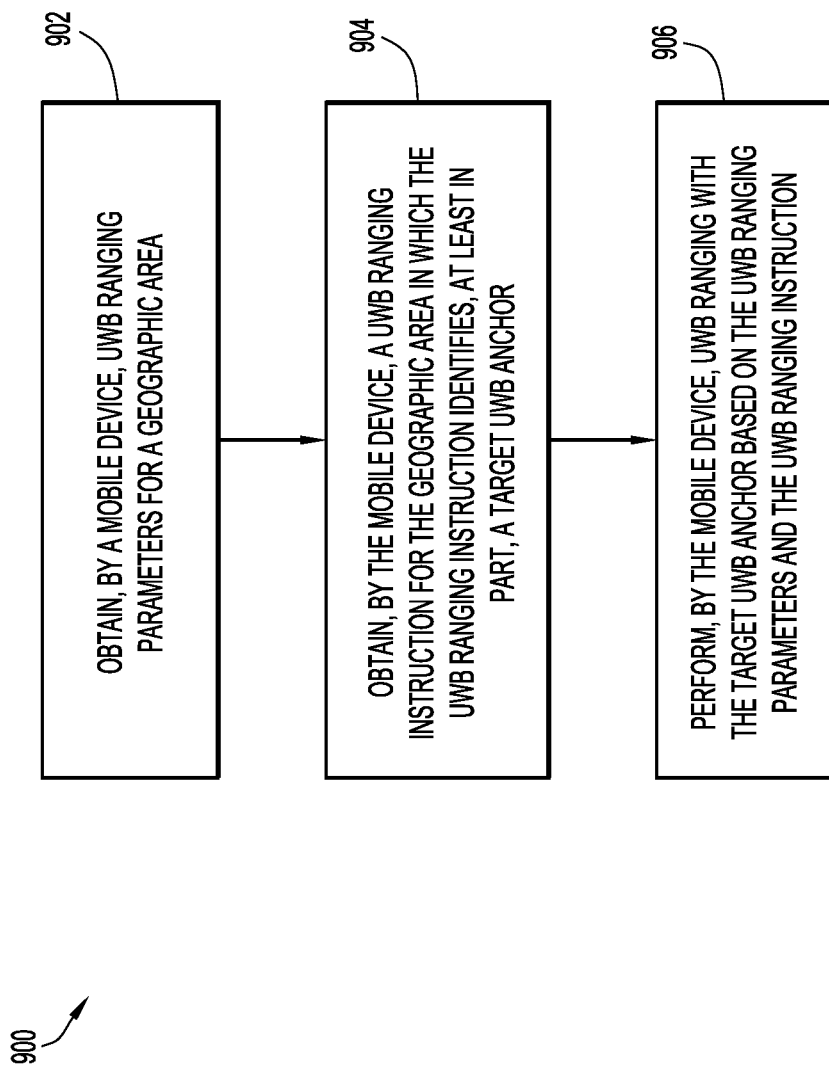
FIG. 9 is another flow chart depicting another method according to an example embodiment.

Referring to FIG. 9, FIG. 9 is another flow chart depicting another method 900 according to an example embodiment. In at least one embodiment, method 900 may be performed by a mobile device having 802.11/Wi-Fi radio communication capabilities, Bluetooth/BLE radio communication capabilities, and UWB radio communication capabilities.

At 902, the method may include obtaining, by a mobile device, UWB ranging parameters for a geographic area (e.g., a venue).

In at least one embodiment, the UWB ranging parameters may be obtained by the mobile device via an 802.11 communication from a radio device in which the mobile device obtains the UWB ranging parameters from the radio device following a query to the radio device for the UWB ranging parameters. In one embodiment, the 802.11 radio communication may be an ANQP response obtained following an ANQP query to the radio device. In at least one embodiment, the query to the radio device may be triggered following the mobile device obtaining an 802.11 beacon or probe response indicating that UWB ranging is available for the geographic area.

In at least one embodiment, the UWB ranging parameters may be obtained by the mobile device via a Bluetooth (e.g., BLE) unicast communication obtained by the mobile device from an radio device in which the Bluetooth unicast communication is obtained following a Bluetooth broadcast communication being obtained by the mobile device from the radio device and the mobile device performing a Bluetooth pairing to the radio device.

In at least one embodiment, the UWB ranging parameters may include a group index identifying a group of UWB anchors for a geographic area; common UWB ranging parameters applicable to all UWB anchors of the group; and a security key (e.g., STS key) to enable encryption of UWB ranging data exchanged between the mobile device and a target UWB anchor.

At 904, the method may include the mobile device obtaining a UWB ranging instruction for the geographic area in which the UWB ranging instruction identifies, at least in part, a target UWB anchor with which the mobile device is to perform UWB ranging.

In at least one embodiment, the UWB ranging instruction may be obtained via a Bluetooth (e.g., BLE) broadcast radio communication including a custom UUID indicating the UWB ranging instruction. In at least one embodiment, the UWB ranging instruction may include a first plurality of bits identifying a UWB channel number, a second plurality of bits identifying a ranging duration value, one or more third bits identifying a ranging end mode; and a fourth plurality of bits identifying a MAC address for the target UWB anchor.

In some embodiments, the UWB ranging instruction may be obtained by the mobile device prior to the device obtaining UWB ranging parameters. For example, the mobile device may obtain a BLE broadcast UUID from a radio device containing the UWB ranging instruction and then may obtain the UWB ranging parameters via a BLE unicast UUID obtained from the radio device.

At 906, the method may include the mobile device performing UWB ranging with the target UWB anchor based on the UWB ranging parameters and the UWB ranging instruction. The mobile device may obtain location information indicating a location of the mobile device as a result of the ranging as a result of the UWB ranging.

Accordingly, an outcome of techniques herein may provide for the ability for a mobile to keep its UWB chipset/radio disabled most of the time. In areas where UWB is available and where accurate ranging may be involved for either the infrastructure and/or the mobile device (e.g., an application for the mobile device), the mobile device can enable its UWB chipset/radio and perform UWB ranging, keeping the radio enabled just long enough for accurate ranging to occur. At the same time, techniques herein may facilitate maximized UWB efficiency by allocating UWB airtime only for the ranging exchanges, thus, increasing the possible scale to more than a hundred concurrent ranging exchanges. In contrast, current implementations involving TWR are typically limited to 18 concurrent exchanges.

Figure 10:
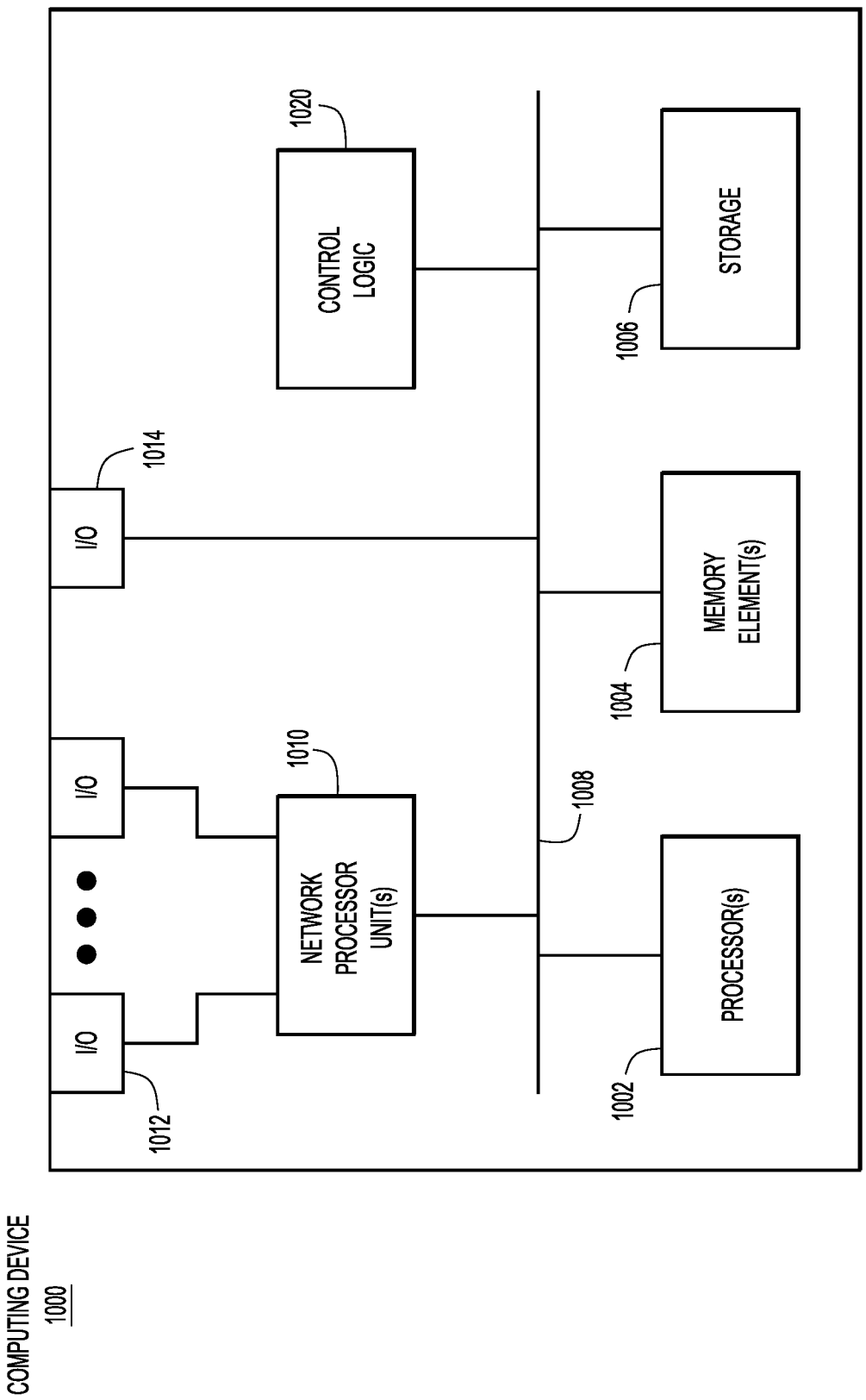
FIG. 10 is a hardware block diagram of a computing device that may perform functions associated with any combination of operations discussed herein in connection with the techniques depicted in FIGS. 1-9.

Referring to FIG. 10, FIG. 10 illustrates a hardware block diagram of a computing device 1000 that may perform functions associated with operations discussed herein in connection with the techniques depicted in FIGS. 1-9. In various embodiments, a computing device, such as computing device 1000 or any combination of computing devices 1000, may be configured as any entity/entities as discussed for the techniques depicted in connection with FIGS. 1-9 in order to perform operations of the various techniques discussed herein.

In at least one embodiment, computing device 1000 may include one or more processor(s) 1002, one or more memory element(s) 1004, storage 1006, a bus 1008, one or more network processor unit(s) 1010 interconnected with one or more network input/output (I/O) interface(s) 1012, one or more I/O interface(s) 1014, and control logic 1020. In various embodiments, instructions associated with logic for computing device 1000 can overlap in any manner and are not limited to the specific allocation of instructions and/or operations described herein.

In at least one embodiment, processor(s) 1002 is/are at least one hardware processor configured to execute various tasks, operations and/or functions for computing device 1000 as described herein according to software and/or instructions configured for computing device. Processor(s) 1002 (e.g., hardware processor(s)) can execute any type of instructions associated with data to achieve the operations detailed herein. In one example, processor(s) 1002 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1004 and/or storage 1006 is/are configured to store data, information, software, and/or instructions associated with computing device 1000, and/or logic configured for memory element(s) 1004 and/or storage 1006. For example, any logic described herein (e.g., control logic 1020) can, in various embodiments, be stored for computing device 1000 using any combination of memory element(s) 1004 and/or storage 1006. Note that in some embodiments, storage 1006 can be consolidated with memory element(s) 1004 (or vice versa), or can overlap/exist in any other suitable manner.

In at least one embodiment, bus 1008 can be configured as an interface that enables one or more elements of computing device 1000 to communicate in order to exchange information and/or data. Bus 1008 can be implemented with any architecture designed for passing control, data and/or information between processors, memory elements/storage, peripheral devices, and/or any other hardware and/or software components that may be configured for computing device 1000. In at least one embodiment, bus 1008 may be implemented as a fast kernel-hosted interconnect, potentially using shared memory between processes (e.g., logic), which can enable efficient communication paths between the processes.

In various embodiments, network processor unit(s) 1010 may enable communication between computing device 1000 and other systems, entities, etc., via network I/O interface(s) 1012 to facilitate operations discussed for various embodiments described herein. In various embodiments, network processor unit(s) 1010 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 1000 and other systems, entities, etc. to facilitate operations for various embodiments described herein. In various embodiments, network I/O interface(s) 1012 can be configured as one or more Ethernet port(s), Fibre Channel ports, and/or any other I/O port(s) now known or hereafter developed. Thus, the network processor unit(s) 1010 and/or network I/O interface(s) 1012 may include suitable interfaces for receiving, transmitting, and/or otherwise communicating data and/or information in a network environment.

I/O interface(s) 1014 allow for input and output of data and/or information with other entities that may be connected to computing device 1000. For example, I/O interface(s) 914 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1020 can include instructions that, when executed, cause processor(s) 1002 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1020) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, and register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1004 and/or storage 1006 can store data, software, code, instructions (e.g., processor instructions), logic, parameters, combinations thereof, and/or the like used for operations described herein. This includes memory element(s) 1004 and/or storage 1006 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In summary, techniques herein may provide for triggering UWB on one or more mobile devices. As UWB may not be available in all locations, mobile devices may selectively enable UWB ranging, as triggered by an infrastructure. Thus, techniques herein may allow an infrastructure to enable UWB ranging on a large number of mobile devices (e.g., hundreds or more) that may be concurrently entering a venue or other geographic location. In various embodiments, mobile devices may also be provided with instructions, parameters, and/or other information related to ranging modes, ranging times, and radio device/element information that may allow each of one or more mobile devices to range securely against one or more different groups of UWB anchors.

In some instances, the infrastructure can also direct UWB ranging actions of mobile devices, thereby organizing mobile device ranging airtime consumption based on various infrastructure criteria. Techniques herein may also allow the infrastructure to stop ranging for one or a group of mobile devices, for example, in locations where movements may not be relevant and/or for instances in which hyperlocation accuracy may not be needed.

In one form, a computer-implemented method is provided that may include providing UWB ranging parameters to a mobile device via a first radio communication, wherein the first radio communication is a non-UWB radio communication; and triggering the mobile device to perform UWB ranging with a UWB anchor, wherein the triggering is performed using a second radio communication.

In one instance, the second radio communication is a Bluetooth radio communication. For example, in one instance, the triggering is performed by broadcasting a Bluetooth UUID indicating a UWB ranging instruction to the mobile device. In some instances, the UWB ranging instruction includes a first plurality of bits identifying a UWB channel number, a second plurality of bits identifying a ranging duration value, one or more third bits identifying a ranging end mode; and a fourth plurality of bits identifying a UWB MAC address for the UWB anchor.

In one instance, the first radio communication is an IEEE 802.11 radio communication. In one instance, providing the UWB ranging parameters to the mobile device triggers the mobile device to enable a Bluetooth radio on the mobile device. In one instance, providing the UWB ranging parameters to the mobile device includes: providing an IEEE 802.11 transmission to the mobile device indicating support for UWB ranging for a geographical area and indicating an availability of the UWB ranging parameters; obtaining an IEEE 802.11 query from the mobile device for the UWB ranging parameters, wherein the IEEE 802.11 query includes a UWB MAC address for the mobile device, an IEEE 802.11 MAC address for the mobile device, and Bluetooth MAC address for the mobile device; and providing an IEEE 802.11 response for the IEEE 802.11 query that includes the UWB ranging parameters. In one instance, the IEEE 802.11 query is an Access Network Query Protocol (ANQP) query and the IEEE 802.11 response is in an ANQP response. In one instance, the ANQP query and the ANQP response are encrypted.

In one instance, the first radio communication is a Bluetooth radio communication, the UWB ranging parameters are provided to the mobile device via a Bluetooth unicast transmission to the mobile device, and the second radio communication is performed prior to the first radio communication.

In one instance, the method may further include providing updated UWB ranging parameters to the mobile device via a third radio communication. In one instance, the third radio communication is Bluetooth radio communication and the updated UWB ranging parameters are provide to the mobile device via a Bluetooth unicast transmission to the mobile device.

In one instance, UWB ranging parameters include one or more of: a group index identifying a group of UWB anchors for a geographic area, wherein the UWB anchor is a member of the group of UWB anchors for the geographic area; a ranging group index for the mobile device; common UWB ranging parameters applicable to all UWB anchors of the group of UWB anchors; and a security key to enable encryption of UWB ranging data exchanged between the mobile device and the UWB anchor.

In one instance, the method may further include providing location information for the mobile device as a result of the UWB ranging.

In at least one form, a method is provided that may include obtaining, by a mobile device, UWB ranging parameters for a geographic area (e.g., a venue, etc.). The UWB ranging parameters may be obtained by the mobile device via a non-UWB radio communication. The method may further include obtaining, by the mobile device, a UWB ranging instruction in which the UWB ranging instruction identifies, at least in part, a target UWB anchor with which the mobile device is to perform UWB ranging. The UWB ranging instruction may be obtained by the mobile device via a non-UWB radio communication. The method may further include performing, by the mobile device, UWB ranging with the target UWB anchor based on the UWB ranging parameters and the UWB ranging instruction. The method may further include the mobile device obtaining location information indicating a location of the mobile device as a result of the UWB ranging.

In at least one embodiment, the UWB ranging parameters may be obtained by the mobile device via an IEEE 802.11 communication from a radio device in which the mobile device obtains the UWB ranging parameters from the radio device following a query to the radio device for the UWB ranging parameters. In one embodiment, the 802.11 radio communication may be an ANQP response obtained following an ANQP query to the radio device. In at least one embodiment, the query to the radio device may be triggered following the mobile device obtaining an 802.11 beacon or probe response indicating that UWB ranging is available for the geographic area.

In at least one embodiment, the UWB ranging parameters may be obtained by the mobile device via a Bluetooth (e.g., BLE) unicast communication obtained by the mobile device from an radio device in which the Bluetooth unicast communication is obtained following a Bluetooth broadcast communication being obtained by the mobile device from the radio device and the mobile device performing a Bluetooth pairing to the radio device.

In at least one embodiment, the UWB ranging parameters may include a group index identifying a group of UWB anchors for a geographic area; common UWB ranging parameters applicable to all UWB anchors of the group; and a security key (e.g., STS key) to enable encryption of UWB ranging data exchanged between the mobile device and a target UWB anchor.

In at least one embodiment, the UWB ranging instruction may be obtained via a Bluetooth (e.g., BLE) broadcast radio communication including a custom UUID indicating the UWB ranging instruction. In at least one embodiment, the UWB ranging instruction may include a first plurality of bits identifying a UWB channel number, a second plurality of bits identifying a ranging duration value, one or more third bits identifying a ranging end mode; and a fourth plurality of bits identifying a MAC address for the target UWB anchor.

In some embodiments, the UWB ranging instruction may be obtained by the mobile device prior to the device obtaining UWB ranging parameters. For example, the mobile device may obtain a BLE broadcast UUID from a radio device containing the UWB ranging instruction and then may obtain the UWB ranging parameters via a BLE unicast UUID obtained from the radio device.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, millimeter wave (mm.wave or mmWave), UWB, etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, and/or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   obtaining, from a mobile device via a first long-range radio communication, a query for ultra-wideband (UWB) ranging parameters, wherein the query includes a UWB Media Access Control (MAC) address for the mobile device, a long-range radio MAC address for the mobile device, and a short-range radio MAC address for the mobile device;
   providing the UWB ranging parameters to the mobile device via a second long-range radio communication; and
   triggering utilizing a short-range radio communication, the mobile device to perform UWB ranging with a UWB anchor.

2. The method of claim 1, wherein the short-range radio communication is a Bluetooth radio communication.

3. The method of claim 2, wherein the triggering is performed by broadcasting a Bluetooth Universally Unique Identifier (UUID) indicating a UWB ranging instruction to the mobile device.

4. The method of claim 3, wherein the UWB ranging instruction includes a first plurality of bits identifying a UWB channel number, a second plurality of bits identifying a ranging duration value, one or more third bits identifying a ranging end mode; and a fourth plurality of bits identifying a UWB MAC address for the UWB anchor.

5. The method of claim 1, wherein the first long-range radio communication and the second long-range radio communication are each an Institute of Electrical and Electronics Engineers (IEEE) 802.11 radio communication.

6. The method of claim 5, wherein providing the UWB ranging parameters to the mobile device triggers the mobile device to enable a short-range radio on the mobile device.

7. The method of claim 5, wherein providing the UWB ranging parameters to the mobile device includes:
   providing an IEEE 802.11 transmission to the mobile device indicating support for UWB ranging for a geographical area and indicating an availability of the UWB ranging parameters;
   obtaining the query from the mobile device for the UWB ranging parameters, wherein the query is an IEEE 802.11 query; and
   providing the UWB ranging parameters to the mobile device via an IEEE 802.11 response for the IEEE 802.11 query that includes the UWB ranging parameters.

8. The method of claim 7, wherein the IEEE 802.11 query is an Access Network Query Protocol (ANQP) query and the IEEE 802.11 response is in an ANQP response.

9. The method of claim 8, wherein the ANQP query and the ANQP response are encrypted.

10. The method of claim 1, further comprising:
    providing updated UWB ranging parameters to the mobile device.

11. The method of claim 10, wherein the updated UWB ranging parameters are provided to the mobile device via a short-range radio unicast transmission to the mobile device.

12. The method of claim 1, wherein the UWB ranging parameters include one or more of:
    a group index identifying a group of UWB anchors for a geographic area, wherein the UWB anchor is a member of the group of UWB anchors for the geographic area;
    a ranging group index for the mobile device;
    common UWB ranging parameters applicable to all UWB anchors of the group of UWB anchors; and
    a security key to enable encryption of UWB ranging data exchanged between the mobile device and the UWB anchor.

13. The method of claim 1, further comprising:
    providing location information for the mobile device as a result of the UWB ranging.

14. One or more non-transitory computer readable storage media encoded with instructions that, when executed by a processor, cause the processor to perform operations, comprising:
    obtaining, from a mobile device via a first long-range radio communication, a query for ultra-wideband (UWB) ranging parameters, wherein the query includes a UWB Media Access Control (MAC) address for the mobile device, a long-range radio MAC address for the mobile device, and a short-range radio MAC address for the mobile device;
    providing the UWB ranging parameters to the mobile device via a second long-range radio communication; and
    triggering utilizing a short-range radio communication, the mobile device to perform UWB ranging with a UWB anchor.

15. The media of claim 14, wherein the triggering is performed by broadcasting a Bluetooth Universally Unique Identifier (UUID) indicating a UWB ranging instruction to the mobile device.

16. The media of claim 15, wherein the UWB ranging instruction includes a first plurality of bits identifying a UWB channel number, a second plurality of bits identifying a ranging duration value, one or more third bits identifying a ranging end mode; and a fourth plurality of bits identifying a UWB MAC address for the UWB anchor.

17. The media of claim 14, wherein the UWB ranging parameters include one or more of:
    a group index identifying a group of UWB anchors for a geographic area, wherein the UWB anchor is a member of the group of UWB anchors for the geographic area;
    a ranging group index for the mobile device;
    common UWB ranging parameters applicable to all UWB anchors of the group of UWB anchors; and
    a security key to enable encryption of UWB ranging data exchanged between the mobile device and the UWB anchor.

18. A system comprising:
    at least one memory element for storing data; and
    at least one processor for executing instructions associated with the data, wherein executing the instructions causes the system to perform operations, comprising:
       obtaining, from a mobile device via a first long-range radio communication, a query for ultra-wideband (UWB) ranging parameters, wherein the query includes a UWB Media Access Control (MAC) address for the mobile device, a long-range radio MAC address for the mobile device, and a short-range radio MAC address for the mobile device;
       providing the UWB ranging parameters to the mobile device via a second long-range radio communication; and
       triggering utilizing a short-range radio communication, the mobile device to perform UWB ranging with a UWB anchor.

19. The system of claim 18, wherein the triggering is performed by broadcasting a Bluetooth Universally Unique Identifier (UUID) indicating a UWB ranging instruction to the mobile device.

20. The system of claim 19, wherein the UWB ranging instruction includes a first plurality of bits identifying a UWB channel number, a second plurality of bits identifying a ranging duration value, one or more third bits identifying a ranging end mode; and a fourth plurality of bits identifying a UWB MAC address for the UWB anchor.

* * * * *